(12) United States Patent
Durvasula et al.

(10) Patent No.: US 10,043,196 B2
(45) Date of Patent: Aug. 7, 2018

(54) EXPENDITURES BASED ON AD IMPRESSIONS

(71) Applicant: American Express Travel Related Services Company, Inc., New York, NY (US)

(72) Inventors: Sastry VSM Durvasula, Phoenix, AZ (US); Lucas Saunders Gebb, Brooklyn, NY (US); Rachna R. Govani, Parsippany, NJ (US); Priyadarshini Koul, Scottsdale, AZ (US); Sarah Claire Peltier, Mt Pleasant, SC (US); Stephanie Schultz, New York, NY (US); Sripriya V. Tiku, Scottsdale, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 15/626,598

(22) Filed: Jun. 19, 2017

(65) Prior Publication Data

US 2017/0286996 A1 Oct. 5, 2017

Related U.S. Application Data

(63) Continuation of application No. 14/464,474, filed on Aug. 20, 2014, now Pat. No. 9,715,697, which is a
(Continued)

(51) Int. Cl.
*G06Q 30/00* (2012.01)
*G06Q 30/02* (2012.01)

(52) U.S. Cl.
CPC ..... *G06Q 30/0246* (2013.01); *G06Q 30/0241* (2013.01); *G06Q 30/0242* (2013.01); *G06Q 30/0243* (2013.01)

(58) Field of Classification Search
USPC ............. 705/14.1, 14.4, 14.41, 14.42, 14.45, 705/14.73, 26, 27; 707/102, 501;
(Continued)

(56) References Cited

U.S. PATENT DOCUMENTS

| 4,833,308 | A | 5/1989 | Humble |
| 4,882,675 | A | 11/1989 | Nichtberger et al. |

(Continued)

FOREIGN PATENT DOCUMENTS

| WO | 2001086378 | 11/2001 |
| WO | 2012024109 | 2/2012 |

(Continued)

OTHER PUBLICATIONS

USPTO; Advisory Action dated Jun. 10, 2015 in U.S. Appl. No. 13/477,806.
(Continued)

*Primary Examiner* — Luis A Brown
(74) *Attorney, Agent, or Firm* — Snell & Wilmer, L.L.P.

(57) ABSTRACT

The present disclosure includes a system, method, and article of manufacture for targeting ad impressions. A list of customer records may be transmitted to a service provider system that identifies a matched customer and installs a cookie on a web client associated with the matched customer. The system may further receive a campaign request from a merchant and transmit the campaign request to the service provider system which may add a flag to the cookie based on the campaign request as well as instruct a media buyer system to bid on an ad impression for the matched customer based on the flag. The system may further receive an expenditure associated with the matched customer who received the ad impression and compare the expenditure to
(Continued)

an expenditure associated with a customer who did not receive targeted ad impression but fits parameters associated with the campaign request.

18 Claims, 5 Drawing Sheets

Related U.S. Application Data continuation of application No. 13/245,636, filed on Sep. 26, 2011, now Pat. No. 8,849,699.

(58) Field of Classification Search
USPC .......................................................... 709/217
See application file for complete search history.

(56) References Cited

U.S. PATENT DOCUMENTS

| | | | |
|---|---|---|---|
| 5,025,372 A | 6/1991 | Burton et al. |
| 5,467,269 A | 11/1995 | Flaten |
| 5,471,669 A | 11/1995 | Lidman |
| 5,729,693 A | 3/1998 | Holda-Fleck |
| 5,918,211 A | 6/1999 | Sloane |
| 5,923,016 A | 7/1999 | Fredregill et al. |
| 5,948,040 A | 9/1999 | DeLorme et al. |
| 5,953,706 A | 9/1999 | Patel |
| 6,009,411 A | 12/1999 | Kepecs |
| 6,018,718 A | 1/2000 | Walker et al. |
| 6,035,280 A | 3/2000 | Christensen |
| 6,039,244 A | 3/2000 | Finsterwald |
| 6,222,914 B1 | 4/2001 | McMullin |
| 6,266,649 B1 | 7/2001 | Linden et al. |
| 6,298,330 B1 * | 10/2001 | Gardenswartz ........ G06Q 30/02 705/14.25 |
| 6,321,208 B1 | 11/2001 | Barnett et al. |
| 6,330,543 B1 | 12/2001 | Kepecs |
| 6,332,126 B1 | 12/2001 | Peirce et al. |
| 6,336,099 B1 | 1/2002 | Barnett et al. |
| 6,343,317 B1 | 1/2002 | Glorikian |
| 6,360,167 B1 | 3/2002 | Millington et al. |
| 6,370,514 B1 | 4/2002 | Messner |
| 6,381,603 B1 | 4/2002 | Chan et al. |
| 6,414,635 B1 | 7/2002 | Stewart et al. |
| 6,430,539 B1 | 8/2002 | Lazarus et al. |
| 6,434,534 B1 | 8/2002 | Walker et al. |
| 6,542,814 B2 | 4/2003 | Polidi et al. |
| 6,584,448 B1 | 6/2003 | Laor |
| 6,587,835 B1 | 7/2003 | Treyz et al. |
| 6,606,619 B2 | 8/2003 | Ortega et al. |
| 6,691,915 B1 | 2/2004 | Thaxton et al. |
| 6,738,711 B2 | 5/2004 | Ohmura et al. |
| 6,748,365 B1 | 6/2004 | Quinlan et al. |
| 6,882,290 B2 | 4/2005 | French et al. |
| 6,883,708 B1 | 4/2005 | Fiedler et al. |
| 6,904,408 B1 | 6/2005 | McCarthy et al. |
| 6,915,265 B1 | 7/2005 | Johnson |
| 6,937,995 B1 | 8/2005 | Kepecs |
| 7,003,476 B1 | 2/2006 | Samra et al. |
| 7,010,497 B1 * | 3/2006 | Nyhan ................... G06Q 30/02 705/1.1 |
| 7,016,856 B1 | 3/2006 | Wiggins |
| 7,016,860 B2 | 3/2006 | Modani et al. |
| 7,054,830 B1 | 5/2006 | Eggleston et al. |
| 7,072,851 B1 | 7/2006 | Wilcox et al. |
| 7,107,238 B2 | 9/2006 | Hatakama et al. |
| 7,120,591 B1 | 10/2006 | Solomon et al. |
| 7,139,793 B2 | 11/2006 | Lala et al. |
| 7,146,328 B1 | 12/2006 | Solomon et al. |
| 7,165,037 B2 | 1/2007 | Lazarus et al. |
| 7,302,429 B1 | 11/2007 | Wanker |
| 7,392,224 B1 | 6/2008 | Bauer et al. |
| 7,428,505 B1 | 9/2008 | Levy et al. |
| 7,430,521 B2 | 9/2008 | Walker et al. |
| 7,455,226 B1 | 11/2008 | Hammond et al. |
| 7,472,073 B1 | 12/2008 | Masi |
| 7,493,268 B2 | 2/2009 | Kepros et al. |
| 7,496,520 B1 | 2/2009 | Handel et al. |
| 7,499,889 B2 | 3/2009 | Golan et al. |
| 7,506,805 B1 | 3/2009 | Chakravarthy |
| 7,512,551 B2 | 3/2009 | Postrel |
| 7,596,566 B1 | 9/2009 | Patwardhan |
| 7,599,858 B1 | 10/2009 | Grady et al. |
| 7,618,318 B2 | 11/2009 | Ciancio et al. |
| 7,630,935 B2 | 12/2009 | Loeger et al. |
| 7,647,278 B1 | 1/2010 | Foth et al. |
| 7,653,572 B1 | 1/2010 | Thompson |
| 7,660,743 B1 | 2/2010 | Messa et al. |
| 7,665,660 B2 | 2/2010 | Degliantoni et al. |
| 7,668,749 B2 | 2/2010 | Kepros et al. |
| 7,676,467 B1 | 3/2010 | Kozyrczak et al. |
| 7,681,786 B1 | 3/2010 | Chakravarthy |
| 7,702,540 B1 | 4/2010 | Woolston |
| 7,706,808 B1 | 4/2010 | Aggarwal et al. |
| 7,711,586 B2 | 5/2010 | Aggarwal et al. |
| 7,734,486 B2 | 6/2010 | Mortimore, Jr. |
| 7,739,134 B2 | 6/2010 | Mortimore, Jr. |
| 7,742,954 B1 | 6/2010 | Handel et al. |
| 7,743,002 B2 | 6/2010 | Hernandez |
| 7,747,524 B2 | 6/2010 | Brown |
| 7,765,119 B2 | 6/2010 | Messa et al. |
| 7,752,328 B2 | 7/2010 | Mortimore, Jr. et al. |
| 7,788,141 B1 | 8/2010 | Sim |
| 7,797,199 B2 | 9/2010 | Forshaw et al. |
| 7,801,760 B2 | 9/2010 | Handel et al. |
| 7,806,328 B2 | 10/2010 | Chakravarthy |
| 7,814,029 B1 | 10/2010 | Siegel |
| 7,844,488 B2 | 11/2010 | Merriman et al. |
| 7,844,490 B2 | 11/2010 | Patterson |
| 7,865,513 B2 | 1/2011 | Welch et al. |
| 7,870,022 B2 | 1/2011 | Bous et al. |
| 7,899,704 B1 | 3/2011 | Thompson |
| 7,925,540 B1 | 4/2011 | Orttung et al. |
| 7,933,810 B2 | 4/2011 | Morgenstern |
| 7,937,330 B2 | 5/2011 | Handel et al. |
| 7,941,374 B2 | 5/2011 | Orttung et al. |
| 7,958,017 B1 | 6/2011 | Rempe et al. |
| 7,962,381 B2 | 6/2011 | Handel et al. |
| 7,966,213 B2 | 6/2011 | Messa et al. |
| 7,970,666 B1 | 6/2011 | Handel |
| 7,991,664 B1 | 8/2011 | Stone |
| 8,070,056 B2 | 12/2011 | Feldman et al. |
| 8,073,719 B2 | 12/2011 | Orttung et al. |
| 8,078,496 B2 | 12/2011 | Postrel |
| 8,082,270 B2 | 12/2011 | Goyal |
| 8,090,707 B1 | 1/2012 | Orttung et al. |
| 8,095,402 B2 | 1/2012 | Orttung et al. |
| 8,108,304 B2 | 1/2012 | Loeger et al. |
| 8,117,073 B1 | 2/2012 | Orttung et al. |
| 8,121,953 B1 | 2/2012 | Orttung et al. |
| 8,126,771 B2 | 2/2012 | Walker et al. |
| 8,126,776 B2 | 2/2012 | Messa et al. |
| 8,131,588 B2 | 3/2012 | Walker et al. |
| 8,140,387 B2 | 3/2012 | Heywood |
| 8,145,522 B2 | 3/2012 | Warren et al. |
| 8,160,922 B2 | 4/2012 | Postrel |
| 8,170,916 B1 | 5/2012 | Dicker et al. |
| 8,175,926 B1 | 5/2012 | Handel et al. |
| 8,180,682 B2 | 5/2012 | Narayanaswami et al. |
| 8,180,796 B1 | 5/2012 | Mah et al. |
| 8,213,423 B1 | 7/2012 | Breau |
| 8,249,934 B2 | 8/2012 | Agarwal et al. |
| 8,438,061 B2 | 5/2013 | Grimes |
| 8,459,551 B2 | 6/2013 | Lee et al. |
| 8,463,643 B2 | 6/2013 | Bennett |
| 8,463,706 B2 | 6/2013 | Cervenka et al. |
| 8,463,851 B2 | 6/2013 | Bennett et al. |
| 8,468,053 B2 | 6/2013 | Bennett |
| 8,473,334 B2 | 6/2013 | Gibbs |
| 8,484,088 B1 | 7/2013 | Orttung et al. |
| 8,484,093 B2 | 7/2013 | Bennett et al. |
| 8,489,452 B1 | 7/2013 | Warner et al. |
| 8,489,456 B2 | 7/2013 | Burgess et al. |
| 8,494,901 B2 | 7/2013 | Magadi et al. |

(56) References Cited

U.S. PATENT DOCUMENTS

| | | | |
|---|---|---|---|
| 8,494,914 B2 | 7/2013 | Mesaros | |
| 8,504,411 B1* | 8/2013 | Subasic | G06Q 30/0201 |
| | | | 705/14.41 |
| 8,504,423 B2 | 8/2013 | Rotbard et al. | |
| 8,515,810 B2 | 8/2013 | Grimes | |
| 8,517,258 B2 | 8/2013 | Taylor et al. | |
| 8,543,470 B2 | 9/2013 | Grady et al. | |
| 8,554,670 B1 | 10/2013 | Blank | |
| 8,560,389 B2 | 10/2013 | Burgess et al. | |
| 8,573,477 B2 | 11/2013 | Bennett et al. | |
| 8,573,491 B2 | 11/2013 | Bennett et al. | |
| 8,606,630 B2 | 12/2013 | Fordyce, III et al. | |
| 8,615,426 B2 | 12/2013 | Carlson | |
| 8,621,068 B2* | 12/2013 | Zohar | G06Q 30/02 |
| | | | 709/224 |
| 8,621,215 B1 | 12/2013 | Iyer | |
| 8,626,579 B2 | 1/2014 | Fordyce, III et al. | |
| 8,639,567 B2 | 1/2014 | Winters | |
| 8,650,071 B2 | 2/2014 | Pointer et al. | |
| 8,655,695 B1* | 2/2014 | Qu | G06Q 30/0251 |
| | | | 705/14.49 |
| 8,725,635 B2 | 5/2014 | Klein et al. | |
| 8,874,674 B2 | 10/2014 | Allison et al. | |
| 9,009,082 B1 | 4/2015 | Marshall et al. | |
| 9,031,866 B1 | 5/2015 | Ng et al. | |
| 9,430,773 B2 | 8/2016 | Aloni et al. | |
| 9,443,262 B1 | 9/2016 | Mamgain | |
| 2001/0014868 A1 | 8/2001 | Herz et al. | |
| 2001/0020242 A1* | 9/2001 | Gupta | G06Q 30/02 |
| | | | 715/210 |
| 2001/0037254 A1 | 11/2001 | Glikman | |
| 2001/0054003 A1 | 12/2001 | Chien et al. | |
| 2002/0052841 A1 | 5/2002 | Guthrie | |
| 2002/0069079 A1 | 6/2002 | Vega | |
| 2002/0069312 A1 | 6/2002 | Jones | |
| 2002/0082920 A1 | 6/2002 | Austin et al. | |
| 2002/0095357 A1 | 7/2002 | Hunter et al. | |
| 2002/0099824 A1* | 7/2002 | Bender | G06F 21/6254 |
| | | | 709/225 |
| 2002/0138343 A1 | 9/2002 | Weatherford et al. | |
| 2002/0178056 A1 | 11/2002 | Lim | |
| 2003/0004802 A1 | 1/2003 | Callegari | |
| 2003/0027630 A1 | 2/2003 | Kelly et al. | |
| 2003/0028426 A1 | 2/2003 | Banerjee | |
| 2003/0028518 A1 | 2/2003 | Mankoff | |
| 2003/0033211 A1 | 2/2003 | Haines et al. | |
| 2003/0061093 A1 | 3/2003 | Todd | |
| 2003/0078832 A1 | 4/2003 | Alvarez et al. | |
| 2003/0208442 A1 | 11/2003 | Cockrill et al. | |
| 2003/0233278 A1 | 12/2003 | Marshall | |
| 2004/0006509 A1 | 1/2004 | Mannik et al. | |
| 2004/0039686 A1 | 2/2004 | Klebenoff | |
| 2004/0098326 A1 | 5/2004 | James | |
| 2004/0098332 A1 | 5/2004 | Dvir | |
| 2004/0122736 A1 | 6/2004 | Stock et al. | |
| 2004/0153389 A1 | 8/2004 | Lortscher | |
| 2004/0215517 A1 | 10/2004 | Chen | |
| 2004/0225509 A1 | 11/2004 | Andre et al. | |
| 2004/0225573 A1 | 11/2004 | Ling | |
| 2004/0243468 A1 | 12/2004 | Cohagan et al. | |
| 2005/0010394 A1 | 1/2005 | Bergeron | |
| 2005/0010428 A1 | 1/2005 | Bergeron | |
| 2005/0010472 A1 | 1/2005 | Quatse et al. | |
| 2005/0021401 A1 | 1/2005 | Postrel | |
| 2005/0033583 A1 | 2/2005 | Bergeron | |
| 2005/0033605 A1 | 2/2005 | Bergeron | |
| 2005/0065848 A1 | 3/2005 | Mitchell et al. | |
| 2005/0071225 A1 | 3/2005 | Bortolin et al. | |
| 2005/0071227 A1 | 3/2005 | Hammad et al. | |
| 2005/0071228 A1 | 3/2005 | Bortolin et al. | |
| 2005/0071230 A1 | 3/2005 | Mankoff | |
| 2005/0075932 A1 | 4/2005 | Mankoff | |
| 2005/0096976 A1 | 5/2005 | Nelms | |
| 2005/0149394 A1 | 7/2005 | Postrel | |
| 2005/0159996 A1 | 7/2005 | Lazarus | |
| 2005/0165684 A1 | 7/2005 | Jensen | |
| 2005/0192863 A1 | 9/2005 | Mohan | |
| 2005/0234753 A1* | 10/2005 | Pinto | G06Q 10/04 |
| | | | 700/44 |
| 2005/0240477 A1 | 10/2005 | Friday et al. | |
| 2005/0246272 A1 | 11/2005 | Kitada et al. | |
| 2005/0273388 A1* | 12/2005 | Roetter | G06Q 30/02 |
| | | | 705/14.4 |
| 2006/0004633 A1* | 1/2006 | Ashbaugh | G06Q 30/02 |
| | | | 705/14.73 |
| 2006/0026067 A1 | 2/2006 | Nicholas et al. | |
| 2006/0041480 A1 | 2/2006 | Briggs | |
| 2006/0053056 A1 | 3/2006 | Alspach-Goss et al. | |
| 2006/0064372 A1 | 3/2006 | Gupta | |
| 2006/0074749 A1 | 4/2006 | Kline | |
| 2006/0076400 A1 | 4/2006 | Fletcher | |
| 2006/0085240 A1 | 4/2006 | Salehi-sedeh et al. | |
| 2006/0095434 A1 | 5/2006 | McCullough et al. | |
| 2006/0111930 A1 | 5/2006 | Ayer et al. | |
| 2006/0116800 A1 | 6/2006 | Obradovich et al. | |
| 2006/0122874 A1 | 6/2006 | Postrel | |
| 2006/0129426 A1 | 6/2006 | Pearson | |
| 2006/0136299 A1 | 6/2006 | Ruhmkorf | |
| 2006/0155603 A1 | 7/2006 | Abendroth et al. | |
| 2006/0155641 A1 | 7/2006 | Postrel | |
| 2006/0167753 A1 | 7/2006 | Teague et al. | |
| 2006/0173672 A1 | 8/2006 | Bergeron | |
| 2006/0178932 A1 | 8/2006 | Lang | |
| 2006/0195359 A1 | 8/2006 | Robinson et al. | |
| 2006/0212355 A1 | 9/2006 | Teague et al. | |
| 2006/0224449 A1 | 10/2006 | Byerley et al. | |
| 2006/0241859 A1 | 10/2006 | Kimchi et al. | |
| 2006/0242011 A1 | 10/2006 | Bell et al. | |
| 2006/0253321 A1 | 11/2006 | Heywood | |
| 2006/0258397 A1 | 11/2006 | Kaplan et al. | |
| 2006/0259364 A1 | 11/2006 | Strock et al. | |
| 2006/0271552 A1 | 11/2006 | McChesney et al. | |
| 2006/0293957 A1* | 12/2006 | Petersen | G06Q 30/02 |
| | | | 705/14.53 |
| 2007/0000997 A1 | 1/2007 | Lambert et al. | |
| 2007/0010942 A1 | 1/2007 | Bill | |
| 2007/0022019 A1 | 1/2007 | Sherwin et al. | |
| 2007/0033104 A1* | 2/2007 | Collins | G06F 17/2785 |
| | | | 705/14.41 |
| 2007/0038515 A1 | 2/2007 | Postrel | |
| 2007/0038516 A1 | 2/2007 | Apple et al. | |
| 2007/0050258 A1 | 3/2007 | Dohse | |
| 2007/0061216 A1 | 3/2007 | Jain et al. | |
| 2007/0061223 A1 | 3/2007 | Rodriguez et al. | |
| 2007/0073599 A1 | 3/2007 | Perry et al. | |
| 2007/0083428 A1 | 4/2007 | Goldstein | |
| 2007/0094114 A1 | 4/2007 | Bulford et al. | |
| 2007/0129995 A1 | 6/2007 | Brandow | |
| 2007/0130000 A1 | 6/2007 | Assanassios | |
| 2007/0136135 A1 | 6/2007 | Loeger et al. | |
| 2007/0146812 A1* | 6/2007 | Lawton | G06Q 30/02 |
| | | | 358/452 |
| 2007/0150349 A1 | 6/2007 | Handel et al. | |
| 2007/0157237 A1* | 7/2007 | Cordray | H04H 60/65 |
| | | | 725/42 |
| 2007/0192178 A1 | 8/2007 | Fung et al. | |
| 2007/0192192 A1 | 8/2007 | Haberman et al. | |
| 2007/0198354 A1 | 8/2007 | Senghore et al. | |
| 2007/0198432 A1 | 8/2007 | Pitroda et al. | |
| 2007/0198937 A1* | 8/2007 | Paris | G06Q 30/02 |
| | | | 715/745 |
| 2007/0208879 A1 | 9/2007 | Liu | |
| 2007/0210152 A1 | 9/2007 | Read | |
| 2007/0214040 A1 | 9/2007 | Patel et al. | |
| 2007/0233517 A1 | 10/2007 | Dayal | |
| 2007/0244741 A1* | 10/2007 | Blume | G06Q 30/02 |
| | | | 705/7.31 |
| 2007/0244811 A1 | 10/2007 | Tumminaro | |
| 2007/0260513 A1 | 11/2007 | Pavlov | |
| 2007/0260523 A1 | 11/2007 | Schadt et al. | |
| 2007/0288312 A1 | 12/2007 | Wang | |
| 2007/0288372 A1 | 12/2007 | Behar et al. | |

(56) References Cited

U.S. PATENT DOCUMENTS

| | | |
|---|---|---|
| 2008/0004917 A1 | 1/2008 | Mortimore, Jr. |
| 2008/0004919 A1 | 1/2008 | Stubbs |
| 2008/0004980 A1 | 1/2008 | Hernandez |
| 2008/0005148 A1 | 1/2008 | Welch et al. |
| 2008/0021772 A1 | 1/2008 | Aloni et al. |
| 2008/0032720 A1 | 2/2008 | Mamdani et al. |
| 2008/0033857 A1 | 2/2008 | Moses |
| 2008/0040211 A1 | 2/2008 | Walker et al. |
| 2008/0040288 A1 | 2/2008 | Mortimore, Jr. et al. |
| 2008/0052140 A1* | 2/2008 | Neal ................ G06Q 30/02 705/1.1 |
| 2008/0052151 A1 | 2/2008 | Xie et al. |
| 2008/0059220 A1 | 3/2008 | Roth et al. |
| 2008/0065491 A1 | 3/2008 | Bakman |
| 2008/0082418 A1 | 4/2008 | Fordyce et al. |
| 2008/0091445 A1 | 4/2008 | Mihic |
| 2008/0091528 A1 | 4/2008 | Rampell et al. |
| 2008/0091537 A1 | 4/2008 | Miller et al. |
| 2008/0091549 A1 | 4/2008 | Chang et al. |
| 2008/0091828 A1 | 4/2008 | Mortimore, Jr. |
| 2008/0092162 A1* | 4/2008 | Lundy ................ G06Q 30/00 725/35 |
| 2008/0109317 A1 | 5/2008 | Singh et al. |
| 2008/0109489 A1 | 5/2008 | Sherwood |
| 2008/0120155 A1 | 5/2008 | Pliha |
| 2008/0126515 A1* | 5/2008 | Chambers ............ G06Q 30/02 709/218 |
| 2008/0133488 A1 | 6/2008 | Bandaru |
| 2008/0147450 A1 | 6/2008 | Mortimore, Jr. |
| 2008/0147514 A1 | 6/2008 | Shuster et al. |
| 2008/0147773 A1 | 6/2008 | Aaron |
| 2008/0154664 A1 | 6/2008 | Kuo et al. |
| 2008/0162206 A1 | 7/2008 | Mak et al. |
| 2008/0167991 A1 | 7/2008 | Carlson et al. |
| 2008/0189169 A1 | 8/2008 | Turpin et al. |
| 2008/0195475 A1 | 8/2008 | Lambert et al. |
| 2008/0195609 A1* | 8/2008 | Paris ................ H04L 43/00 |
| 2008/0196060 A1 | 8/2008 | Varghese |
| 2008/0201197 A1 | 8/2008 | Orttung et al. |
| 2008/0201224 A1 | 8/2008 | Owens et al. |
| 2008/0201432 A1 | 8/2008 | Orttung et al. |
| 2008/0210753 A1 | 9/2008 | Plozay et al. |
| 2008/0255940 A1 | 10/2008 | Perreault et al. |
| 2008/0262925 A1 | 10/2008 | Kim |
| 2008/0263135 A1* | 10/2008 | Olliphant .......... G06F 17/30905 709/203 |
| 2008/0270223 A1 | 10/2008 | Collins et al. |
| 2008/0270251 A1 | 10/2008 | Coelho et al. |
| 2008/0276270 A1 | 11/2008 | Kotaru et al. |
| 2008/0281699 A1* | 11/2008 | Whitehead ............ G06Q 30/02 705/14.41 |
| 2008/0281710 A1 | 11/2008 | Hoal |
| 2008/0294624 A1 | 11/2008 | Kanigsberg et al. |
| 2008/0300894 A1* | 12/2008 | John ................ G06Q 30/02 705/1.1 |
| 2008/0300979 A1 | 12/2008 | Abhyanker |
| 2009/0006142 A1 | 1/2009 | Orttung et al. |
| 2009/0006143 A1 | 1/2009 | Orttung et al. |
| 2009/0006188 A1 | 1/2009 | Guo et al. |
| 2009/0006194 A1 | 1/2009 | Sridharan et al. |
| 2009/0012839 A1 | 1/2009 | Fusillo et al. |
| 2009/0018916 A1 | 1/2009 | Seven et al. |
| 2009/0030609 A1 | 1/2009 | Orttung et al. |
| 2009/0030742 A1 | 1/2009 | Orttung et al. |
| 2009/0030769 A1 | 1/2009 | Orttung et al. |
| 2009/0030779 A1 | 1/2009 | Tollinger et al. |
| 2009/0037264 A1 | 2/2009 | Del Favero et al. |
| 2009/0055292 A1 | 2/2009 | Chong et al. |
| 2009/0063268 A1 | 3/2009 | Burgess et al. |
| 2009/0063351 A1 | 3/2009 | Schmeyer et al. |
| 2009/0076912 A1 | 3/2009 | Rajan et al. |
| 2009/0094048 A1 | 4/2009 | Wallace et al. |
| 2009/0125719 A1* | 5/2009 | Cochran .............. G06Q 30/02 713/171 |
| 2009/0132347 A1 | 5/2009 | Anderson et al. |
| 2009/0140799 A1 | 6/2009 | Kasperkovitz |
| 2009/0150272 A1 | 6/2009 | Blythe |
| 2009/0156310 A1 | 6/2009 | Fargo |
| 2009/0163227 A1 | 6/2009 | Collins |
| 2009/0164314 A1 | 6/2009 | Blythe |
| 2009/0171842 A1 | 7/2009 | Blythe |
| 2009/0171853 A1 | 7/2009 | Georgiou et al. |
| 2009/0182718 A1 | 7/2009 | Waclawik et al. |
| 2009/0210261 A1 | 8/2009 | Mortimore, Jr. et al. |
| 2009/0228365 A1 | 9/2009 | Tomchek et al. |
| 2009/0247193 A1* | 10/2009 | Kalavade .............. H04L 67/20 455/456.3 |
| 2009/0247282 A1 | 10/2009 | Cheng |
| 2009/0248457 A1 | 10/2009 | Munter et al. |
| 2009/0248543 A1 | 10/2009 | Nihalani et al. |
| 2009/0259499 A1 | 10/2009 | Bhojwani et al. |
| 2009/0265236 A1 | 10/2009 | Schultz et al. |
| 2009/0271263 A1 | 10/2009 | Regmi et al. |
| 2009/0276306 A1 | 11/2009 | Hicks |
| 2009/0287562 A1 | 11/2009 | Bosch et al. |
| 2009/0288012 A1 | 11/2009 | Hertel et al. |
| 2009/0288140 A1 | 11/2009 | Huber |
| 2009/0289111 A1 | 11/2009 | Motycka et al. |
| 2009/0313109 A1 | 12/2009 | Bous et al. |
| 2009/0319353 A1 | 12/2009 | Palmeri |
| 2009/0327062 A1 | 12/2009 | Botes |
| 2009/0327129 A1 | 12/2009 | Collas |
| 2009/0327174 A1 | 12/2009 | Honkala |
| 2010/0002722 A1 | 1/2010 | Porat |
| 2010/0057565 A1 | 3/2010 | Au-Yeung et al. |
| 2010/0076777 A1 | 3/2010 | Paretti et al. |
| 2010/0079336 A1 | 4/2010 | Skibiski et al. |
| 2010/0082418 A1 | 4/2010 | Loeger et al. |
| 2010/0082446 A1 | 4/2010 | Hjelm et al. |
| 2010/0088174 A1 | 4/2010 | Cohagan et al. |
| 2010/0094697 A1 | 4/2010 | Cananaugh |
| 2010/0094698 A1 | 4/2010 | Cawley |
| 2010/0094699 A1 | 4/2010 | Beal |
| 2010/0106568 A1 | 4/2010 | Grimes |
| 2010/0106569 A1 | 4/2010 | Grimes |
| 2010/0106578 A1 | 4/2010 | Allio et al. |
| 2010/0106596 A1 | 4/2010 | Grimes |
| 2010/0114661 A1 | 5/2010 | Alderfer |
| 2010/0114686 A1 | 5/2010 | Carlson et al. |
| 2010/0131342 A1* | 5/2010 | Thibedeau ............ G06Q 20/202 705/14.13 |
| 2010/0131840 A1 | 5/2010 | Walker et al. |
| 2010/0138299 A1 | 6/2010 | Preston et al. |
| 2010/0145744 A1 | 6/2010 | Beck et al. |
| 2010/0145762 A1 | 6/2010 | Coladonato et al. |
| 2010/0145778 A1 | 6/2010 | Fordyce et al. |
| 2010/0145786 A1 | 6/2010 | Fordyce, III et al. |
| 2010/0145860 A1 | 6/2010 | Pelegero |
| 2010/0153194 A1 | 6/2010 | Oram |
| 2010/0179879 A1 | 7/2010 | Cunningham et al. |
| 2010/0191572 A1 | 7/2010 | Newman et al. |
| 2010/0203963 A1 | 8/2010 | Allen |
| 2010/0211419 A1 | 8/2010 | Nickolayev et al. |
| 2010/0228613 A1 | 9/2010 | Anderson et al. |
| 2010/0241502 A1 | 9/2010 | Walker et al. |
| 2010/0241559 A1 | 9/2010 | O'Connor et al. |
| 2010/0250351 A1 | 9/2010 | Gillenson et al. |
| 2010/0250356 A1 | 9/2010 | Gillenson et al. |
| 2010/0257047 A1 | 10/2010 | Foodman et al. |
| 2010/0262456 A1 | 10/2010 | Feng et al. |
| 2010/0312629 A1 | 12/2010 | Wolf et al. |
| 2010/0324990 A1 | 12/2010 | D'Angelo et al. |
| 2010/0332307 A1 | 12/2010 | Parento |
| 2011/0004497 A1 | 1/2011 | Mortimore, Jr. et al. |
| 2011/0022448 A1 | 1/2011 | Strock et al. |
| 2011/0022455 A1 | 1/2011 | Wolf et al. |
| 2011/0029363 A1 | 2/2011 | Gillenson et al. |
| 2011/0029364 A1 | 2/2011 | Roeding et al. |
| 2011/0029367 A1 | 2/2011 | Olson et al. |
| 2011/0035266 A1 | 2/2011 | Patterson |
| 2011/0040539 A1 | 2/2011 | Szymczyk et al. |
| 2011/0047023 A1 | 2/2011 | Lieblang et al. |
| 2011/0055880 A1 | 3/2011 | Archer |

(56) References Cited

U.S. PATENT DOCUMENTS

| | | |
|---|---|---|
| 2011/0066483 A1 | 3/2011 | Salmon et al. |
| 2011/0066548 A1 | 3/2011 | Rodin |
| 2011/0078030 A1 | 3/2011 | Borst et al. |
| 2011/0078055 A1 | 3/2011 | Faribault et al. |
| 2011/0083101 A1 | 4/2011 | Sharon et al. |
| 2011/0087530 A1 | 4/2011 | Fordyce et al. |
| 2011/0087531 A1 | 4/2011 | Winters et al. |
| 2011/0093327 A1 | 4/2011 | Fordyce et al. |
| 2011/0093335 A1 | 4/2011 | Fordyce et al. |
| 2011/0093361 A1 | 4/2011 | Morales |
| 2011/0106607 A1 | 5/2011 | Alfonso et al. |
| 2011/0119133 A1 | 5/2011 | Igelman et al. |
| 2011/0125561 A1 | 5/2011 | Marcus |
| 2011/0125565 A1 | 5/2011 | MacIlwaine et al. |
| 2011/0131077 A1 | 6/2011 | Tan |
| 2011/0137716 A1 | 6/2011 | Reuthe et al. |
| 2011/0137717 A1 | 6/2011 | Reuthe et al. |
| 2011/0137721 A1 | 6/2011 | Bansal |
| 2011/0145047 A1 | 6/2011 | Chetty et al. |
| 2011/0145149 A1 | 6/2011 | Valdes et al. |
| 2011/0161149 A1 | 6/2011 | Kaplan |
| 2011/0161154 A1 | 6/2011 | McLaughlin et al. |
| 2011/0161172 A1* | 6/2011 | Lee ................ G06O 30/02 705/14.55 |
| 2011/0167440 A1* | 7/2011 | Greenfield ........... H04L 63/102 725/25 |
| 2011/0178928 A1 | 7/2011 | Carmichael et al. |
| 2011/0184792 A1 | 7/2011 | Butcher et al. |
| 2011/0191150 A1 | 8/2011 | Blackhurst et al. |
| 2011/0023124 A1 | 9/2011 | Bhatia et al. |
| 2011/0213670 A1 | 9/2011 | Strutton |
| 2011/0218031 A1 | 9/2011 | Bryant et al. |
| 2011/0225033 A1 | 9/2011 | Schmeyer et al. |
| 2011/0231224 A1 | 9/2011 | Winters |
| 2011/0231235 A1 | 9/2011 | MacIlwaine et al. |
| 2011/0231246 A1* | 9/2011 | Bhatia .................. G06Q 30/00 705/14.43 |
| 2011/0238469 A1 | 9/2011 | Gershman et al. |
| 2011/0246219 A1* | 10/2011 | Smith .................. G06Q 10/087 705/2 |
| 2011/0246280 A1 | 10/2011 | Satyavolu et al. |
| 2011/0246281 A1 | 10/2011 | Satyavolu et al. |
| 2011/0246287 A1 | 10/2011 | Wright et al. |
| 2011/0246299 A1 | 10/2011 | Satyavolu et al. |
| 2011/0251883 A1 | 10/2011 | Satyavolu et al. |
| 2011/0251891 A1 | 10/2011 | Satyavolu et al. |
| 2011/0251934 A1 | 10/2011 | Satyavolu et al. |
| 2011/0258011 A1 | 10/2011 | Burns |
| 2011/0264490 A1 | 10/2011 | Durvasula et al. |
| 2011/0270617 A1 | 11/2011 | Pacheco E Murta et al. |
| 2011/0270666 A1 | 11/2011 | Welsh et al. |
| 2011/0276373 A1 | 11/2011 | Juszczak et al. |
| 2011/0276377 A1 | 11/2011 | Kim et al. |
| 2011/0282702 A1 | 11/2011 | Mortimore, Jr. |
| 2011/0288918 A1 | 11/2011 | Cervenka et al. |
| 2011/0295689 A1* | 12/2011 | Brady ................ G06Q 30/0241 705/14.54 |
| 2011/0295749 A1 | 12/2011 | Scalisi |
| 2011/0302011 A1 | 12/2011 | Yoder et al. |
| 2011/0307509 A1* | 12/2011 | Hsiao .................. G06Q 30/02 707/769 |
| 2011/0313840 A1 | 12/2011 | Mason et al. |
| 2011/0313874 A1 | 12/2011 | Hardie et al. |
| 2011/0320250 A1 | 12/2011 | Gemmell et al. |
| 2012/0004964 A1 | 1/2012 | Satyavolu et al. |
| 2012/0004965 A1 | 1/2012 | Satyavolu et al. |
| 2012/0004966 A1 | 1/2012 | Satyavolu et al. |
| 2012/0004967 A1 | 1/2012 | Satyavolu et al. |
| 2012/0004968 A1 | 1/2012 | Satyavolu et al. |
| 2012/0004969 A1 | 1/2012 | Satyavolu et al. |
| 2012/0004970 A1 | 1/2012 | Satyavolu et al. |
| 2012/0004975 A1 | 1/2012 | Satyavolu et al. |
| 2012/0010932 A1 | 1/2012 | Satyavolu et al. |
| 2012/0010933 A1 | 1/2012 | Satyavolu et al. |
| 2012/0010934 A1 | 1/2012 | Walker et al. |
| 2012/0010936 A1 | 1/2012 | Satyavolu et al. |
| 2012/0010937 A1 | 1/2012 | Hanson et al. |
| 2012/0022923 A1 | 1/2012 | Walker et al. |
| 2012/0023122 A1 | 1/2012 | Gregov et al. |
| 2012/0029990 A1 | 2/2012 | Fisher |
| 2012/0029996 A1 | 2/2012 | Lang et al. |
| 2012/0030048 A1 | 2/2012 | Manley et al. |
| 2012/0035965 A1 | 2/2012 | Maguire |
| 2012/0035997 A1 | 2/2012 | Burgess et al. |
| 2012/0036079 A1 | 2/2012 | Sushil et al. |
| 2012/0036178 A1* | 2/2012 | Gavini .................. G06F 9/5027 709/203 |
| 2012/0046958 A1 | 2/2012 | Pynadath |
| 2012/0047008 A1 | 2/2012 | Alhadeff et al. |
| 2012/0053987 A1 | 3/2012 | Satyavolu et al. |
| 2012/0059701 A1 | 3/2012 | Van der Veen et al. |
| 2012/0066037 A1 | 3/2012 | Glen |
| 2012/0066046 A1 | 3/2012 | Satyavolu et al. |
| 2012/0066050 A1 | 3/2012 | Satyavolu et al. |
| 2012/0066051 A1 | 3/2012 | Black et al. |
| 2012/0066062 A1 | 3/2012 | Yoder et al. |
| 2012/0072270 A1 | 3/2012 | Waylonis et al. |
| 2012/0078689 A1 | 3/2012 | Rothschild |
| 2012/0101881 A1 | 4/2012 | Taylor et al. |
| 2012/0109751 A1 | 5/2012 | Binenstock et al. |
| 2012/0130737 A1 | 5/2012 | Finizio |
| 2012/0150641 A1* | 6/2012 | Dobbs .................. G06Q 30/02 705/14.53 |
| 2012/0150740 A1 | 6/2012 | Isaacson et al. |
| 2012/0196568 A1 | 8/2012 | Bakshi |
| 2012/0197707 A1 | 8/2012 | Cohagan |
| 2012/0203604 A1 | 8/2012 | Brown et al. |
| 2012/0203846 A1 | 8/2012 | Hull et al. |
| 2012/0209672 A1 | 8/2012 | Winner et al. |
| 2012/0209695 A1 | 8/2012 | Winner et al. |
| 2012/0209696 A1 | 8/2012 | Winner et al. |
| 2012/0209771 A1 | 8/2012 | Winner et al. |
| 2012/0220308 A1 | 8/2012 | Ledlie |
| 2012/0221437 A1 | 8/2012 | Yoo |
| 2012/0221479 A1 | 8/2012 | Schneck et al. |
| 2012/0226530 A1 | 9/2012 | Gebb et al. |
| 2012/0239417 A1 | 9/2012 | Pourfallah |
| 2012/0239479 A1 | 9/2012 | Amaro et al. |
| 2012/0246004 A1 | 9/2012 | Book |
| 2012/0253852 A1 | 10/2012 | Pourfallah |
| 2012/0253957 A1 | 10/2012 | Bakshi |
| 2012/0278127 A1 | 11/2012 | Kirakosyan et al. |
| 2012/0296724 A1 | 11/2012 | Faro et al. |
| 2012/0303425 A1 | 11/2012 | Katzin et al. |
| 2012/0303430 A1 | 11/2012 | Tiku et al. |
| 2013/0006737 A1 | 1/2013 | Goldberg |
| 2013/0006766 A1* | 1/2013 | Dedeoglu ............... G06Q 30/02 705/14.53 |
| 2013/0013396 A1* | 1/2013 | Vinson .................. G06Q 30/00 705/14.45 |
| 2013/0024256 A1 | 1/2013 | Wolf et al. |
| 2013/0040654 A1 | 2/2013 | Parish |
| 2013/0041902 A1 | 2/2013 | Swann et al. |
| 2013/0060623 A1 | 3/2013 | Walker et al. |
| 2013/0060644 A1* | 3/2013 | Le Ouay ............ G06Q 30/0241 705/14.69 |
| 2013/0073336 A1 | 3/2013 | Heath |
| 2013/0073361 A1 | 3/2013 | Silver |
| 2013/0073366 A1 | 3/2013 | Heath |
| 2013/0073371 A1 | 3/2013 | Bosworth et al. |
| 2013/0073374 A1 | 3/2013 | Heath |
| 2013/0073376 A1 | 3/2013 | Heath |
| 2013/0073377 A1 | 3/2013 | Heath |
| 2013/0073387 A1 | 3/2013 | Heath |
| 2013/0073388 A1 | 3/2013 | Heath |
| 2013/0073389 A1 | 3/2013 | Heath |
| 2013/0073400 A1 | 3/2013 | Heath |
| 2013/0073473 A1 | 3/2013 | Heath |
| 2013/0073568 A1 | 3/2013 | Federov et al. |
| 2013/0080259 A1* | 3/2013 | Durvasula ............ G06Q 30/0241 705/14.66 |
| 2013/0091000 A1 | 4/2013 | Hagey et al. |
| 2013/0103472 A1 | 4/2013 | Burgess et al. |

(56) References Cited

U.S. PATENT DOCUMENTS

| | | | |
|---|---|---|---|
| 2013/0110555 | A1 | 5/2013 | Dunham |
| 2013/0110604 | A1 | 5/2013 | Rooke et al. |
| 2013/0124283 | A1 | 5/2013 | Kaulbach |
| 2013/0132175 | A1 | 5/2013 | Claessen et al. |
| 2013/0132183 | A1 | 5/2013 | Klein et al. |
| 2013/0145016 | A1 | 6/2013 | Vantalon |
| 2013/0151602 | A1 | 6/2013 | McClelland et al. |
| 2013/0173320 | A1 | 7/2013 | Bank et al. |
| 2013/0173478 | A1 | 7/2013 | Farhi |
| 2013/0178280 | A1 | 7/2013 | Ganz |
| 2013/0179246 | A1 | 7/2013 | Ross et al. |
| 2013/0191195 | A1 | 7/2013 | Carlson et al. |
| 2013/0212177 | A1 | 8/2013 | Friedman |
| 2013/0218653 | A1 | 8/2013 | Rooke et al. |
| 2013/0227636 | A1 | 8/2013 | Bettini |
| 2013/0238412 | A1 | 9/2013 | Boncyk et al. |
| 2013/0246146 | A1 | 9/2013 | Fischer et al. |
| 2013/0246185 | A1 | 9/2013 | Hardman et al. |
| 2013/0260727 | A1 | 10/2013 | Knudson et al. |
| 2013/0262209 | A1 | 10/2013 | Boyer |
| 2013/0268333 | A1 | 10/2013 | Ovick et al. |
| 2013/0275192 | A1 | 10/2013 | Aissa |
| 2013/0304563 | A1 | 11/2013 | Haupt et al. |
| 2013/0325946 | A1 | 12/2013 | Allison, Jr. et al. |
| 2013/0346170 | A1 | 12/2013 | Epstein et al. |
| 2014/0006129 | A1 | 1/2014 | Heath |
| 2014/0006132 | A1 | 1/2014 | Barker |
| 2014/0025451 | A1 | 1/2014 | Knowles et al. |
| 2014/0025452 | A1 | 1/2014 | Knowles et al. |
| 2014/0025453 | A1 | 1/2014 | Knowles et al. |
| 2014/0025460 | A1 | 1/2014 | Knowles et al. |
| 2014/0046675 | A1 | 2/2014 | Harwood |
| 2014/0046744 | A1 | 2/2014 | Hagey |
| 2014/0046748 | A1 | 2/2014 | Nagarajan et al. |
| 2014/0046794 | A1 | 2/2014 | Vallery |
| 2014/0108108 | A1 | 4/2014 | Artman et al. |
| 2014/0108521 | A1* | 4/2014 | Marquess ........... H04L 67/2823 709/203 |
| 2014/0164199 | A1 | 6/2014 | Wilkes |
| 2015/0039393 | A1 | 2/2015 | Jain |
| 2015/0073925 | A1 | 3/2015 | Renfroe |
| 2015/0073980 | A1 | 3/2015 | Griffin |
| 2015/0100433 | A1 | 4/2015 | Choy |
| 2015/0170256 | A1 | 6/2015 | Pettyjohn |
| 2015/0248702 | A1 | 9/2015 | Chatterton |
| 2016/0021152 | A1 | 1/2016 | Maguire |
| 2016/0364790 | A1 | 12/2016 | Lanpher |

FOREIGN PATENT DOCUMENTS

| | | |
|---|---|---|
| WO | 2012106114 | 8/2012 |
| WO | 2012170088 | 12/2012 |
| WO | 2013015846 | 1/2013 |
| WO | 2014106207 | 7/2014 |
| WO | 2015102889 | 7/2015 |
| WO | 2015134947 | 9/2015 |

OTHER PUBLICATIONS

USPTO; Advisory Action dated Jun. 11, 2015 in U.S. Appl. No. 13/926,789.
USPTO; Advisory Action dated Jun. 15, 2015 in U.S. Appl. No. 13/715,770.
USPTO; Office Action dated Jun. 19, 2015 in U.S. Appl. No. 13/794,301.
USPTO; Office Action dated Jun. 25, 2015 in U.S. Appl. No. 13/889,307.
USPTO; Advisory Action dated Jun. 25, 2015 in U.S. Appl. No. 13/734,693.
USPTO; Advisory Action dated Jun. 26, 2015 in U.S. Appl. No. 13/794,145.
USPTO; Advisory Action dated Jun. 29, 2015 in U.S. Appl. No. 13/715,792.
USPTO; Office Action dated Jul. 10, 2015 in U.S. Appl. No. 13/794,374.
USPTO; Advisory Action dated Jul. 10, 2015 in U.S. Appl. No. 12/857,424.
USPTO; Office Action dated Jul. 10, 2015 in U.S. Appl. No. 13/411,281.
USPTO; Final Office Action dated Jul. 17, 2015 in U.S. Appl. No. 13/188,693.
USPTO; Final Office Action dated Jul. 20, 2015 in U.S. Appl. No. 13/686,608.
USPTO; Advisory Action dated Jul. 21, 2015 in U.S. Appl. No. 11/779,734.
USPTO; Final Office Action dated Jul. 23, 2015 in U.S. Appl. No. 13/466,445.
USPTO; Office Action dated Aug. 4, 2015 in U.S. Appl. No. 13/794,334.
USPTO; Office Action dated Aug. 5, 2015 in U.S. Appl. No. 13/926,789.
USPTO; Final Office Action dated Aug. 5, 2015 in U.S. Appl. No. 13/021,237.
USPTO; Final Office Action dated Aug. 7, 2015 in U.S. Appl. No. 13/889,299.
USPTO; Office Action dated Aug. 11, 2015 in U.S. Appl. No. 13/926,895.
USPTO; Final Office Action dated Aug. 12, 2015 in U.S. Appl. No. 13/468,880.
USPTO; Office Action dated Aug. 17, 2015 in U.S. Appl. No. 14/065,883.
USPTO; Office Action dated Aug. 17, 2015 in U.S. Appl. No. 13/439,768.
USPTO; Office Action dated Aug. 19, 2015 in U.S. Appl. No. 13/926,884.
USPTO; Office Action dated Aug. 28, 2015 in U.S. Appl. No. 13/794,272.
Burke, "Hybrid Recommender Systems: Survey and Experiments," User modeling and user-adapted interaction, 2002, Kluwer Academic Publishers, pp. 331-370.
Aimeur et al., "Alambic: a privacy-preserving recommender system for electronic commerce," Feb. 27, 2008, Springer-Verlag, pp. 307-334.
Tang, "Approac to detection of community's consensus and interest," Institute of Systems Science, 2008, Springer-Verlag, pp. 17-29.
Lee et al., "iJADE eMiner—A Web Based Mining Agent Based on Intelligent Java Agent Development Environment (iJADE) on Internet Shopping," Advances in Knowledge Discovery and Data Mining, 2001, Springer-Verlag, pp. 28-40.
Written Opinion dated Aug. 5, 2015 in Singapore Application No. 11201400788P.
USPTO; Advisory Action dated Sep. 29, 2015 in U.S. Appl. No. 13/686,608.
USPTO; Notice of Allowance dated Sep. 29, 2015 in U.S. Appl. No. 13/715,792.
USPTO; Office Action dated Oct. 8, 2015 in U.S. Appl. No. 13/941,306.
USPTO; Advisory Action dated Oct. 13, 2015 in U.S. Appl. No. 13/021,237.
USPTO; Advisory Action dated Oct. 16, 2015 in U.S. Appl. No. 13/466,445.
USPTO; Final Office Action dated Oct. 16, 2015 in U.S. Appl. No. 13/443,100.
USPTO; Advisory Action dated Oct. 22, 2015 in U.S. Appl. No. 13/188,693.
USPTO; Final Office Action dated Oct. 26, 2015 in U.S. Appl. No. 13/476,910.
USPTO; Final Office Action dated Oct. 26, 2015 in U.S. Appl. No. 13/467,503.
USPTO; Advisory Action dated Nov. 17, 2015 in U.S. Appl. No. 13/889,299.
USPTO; Advisory Action dated Nov. 17, 2015 in U.S. Appl. No. 13/468,880.
USPTO; Office Action dated Dec. 4, 2015 in U.S. Appl. No. 13/794,145.

(56) References Cited

OTHER PUBLICATIONS

USPTO; Office Action dated Dec. 17, 2015 in U.S. Appl. No. 13/715,770.
USPTO; Office Action dated Dec. 31, 2015 in U.S. Appl. No. 13/734,693.
USPTO; Final Office Action dated Dec. 30, 2015 in U.S. Appl. No. 14/065,883.
USPTO; Advisory Action dated Jan. 6, 2016 in U.S. Appl. No. 13/443,100.
USPTO; Final Office Action dated Jan. 11, 2016 in U.S. Appl. No. 13/411,281.
USPTO; Advisory Action dated Jan. 11, 2016 in U.S. Appl. No. 13/467,503.
USPTO; Office Action dated Jan. 14, 2016 in U.S. Appl. No. 13/889,272.
USPTO; Final Office Action dated Jan. 14, 2016 in U.S. Appl. No. 13/794,301.
USPTO; Office Action dated Feb. 26, 2014 in U.S. Appl. No. 13/467,503.
USPTO; Office Action dated Feb. 26, 2014 in U.S. Appl. No. 12/857,389.
USPTO; Office Action dated Feb. 26, 2014 in U.S. Appl. No. 13/466,412.
USPTO; Office Action dated Feb. 26, 2014 in U.S. Appl. No. 13/021,237.
USPTO; Office Action dated Feb. 26, 2014 in U.S. Appl. No. 13/466,445.
USPTO; Office Action dated Feb. 26, 2014 in U.S. Appl. No. 13/889,305.
USPTO; Office Action dated Mar. 7, 2014 in U.S. Appl. No. 13/889,285.
USPTO; Office Action dated Mar. 11, 2014 in U.S. Appl. No. 13/153,890.
USPTO; Final Office Action dated Mar. 13, 2014 in U.S. Appl. No. 13/889,272.
USPTO; Final Office Action dated Apr. 25, 2014 in U.S. Appl. No. 13/889,299.
USPTO; Final Office Action dated Apr. 28, 2014 in U.S. Appl. No. 13/889,288.
USPTO; Notice of Allowance dated May 22, 2014 in U.S. Appl. No. 13/245,636.
International Preliminary Report on Patentability dated Aug. 22, 2013 in PCT/US2012/056231.
USPTO; Office Action dated May 7, 2014 in U.S. Appl. No. 13/477,806.
USPTO; Final Office Action dated May 13, 2014 in U.S. Appl. No. 13/476,910.
USPTO; Final Office Action dated May 20, 2014 in U.S. Appl. No. 13/593,204.
USPTO; Advisory Action dated Jul. 8, 2014 in U.S. Appl. No. 13/889,299.
USPTO; Final Office Action dated May 29, 2014 in U.S. Appl. No. 13/468,931.
USPTO; Advisory Action dated Jun. 2, 2014 in U.S. Appl. No. 13/889,272.
USPTO; Office Action dated Jun. 5, 2014 in U.S. Appl. No. 11/779,734.
USPTO; Office Action dated Jun. 11, 2014 in U.S. Appl. No. 13/188,693.
USPTO; Final Office Action dated Jun. 16, 2014 in U.S. Appl. No. 13/467,503.
USPTO; Final Office Action dated Jun. 16, 2014 in U.S. Appl. No. 12/857,389.
USPTO; Final Office Action dated Jun. 16, 2014 in U.S. Appl. No. 13/466,412.
USPTO; Final Office Action dated Jun. 16, 2014 in U.S. Appl. No. 13/466,445.
USPTO; Office Action dated Jun. 24, 2014 in U.S. Appl. No. 13/468,880.
USPTO; Final Office Action dated Jun. 30, 2014 in U.S. Appl. No. 13/021,237.
USPTO; Final Office Action dated Jun. 30, 2014 in U.S. Appl. No. 13/889,305.
USPTO; Notice of Allowance dated Jul. 2, 2014 in U.S. Appl. No. 13/889,285.
USPTO; Advisory Action dated Jul. 2, 2014 in U.S. Appl. No. 13/889,288.
USPTO; Office Action dated Jul. 3, 2014 in U.S. Appl. No. 13/889,307.
International Preliminary Report on Patentability dated Sep. 19, 2012 in Application No. PCT/US2011/047012.
USPTO; Final Office Action dated Jan. 28, 2015 in U.S. Appl. No. 13/889,307.
USPTO; Office Action dated Oct. 11, 2013 in U.S. Appl. No. 13/245,636.
USPTO; Office Action dated Feb. 5, 2014 in U.S. Appl. No. 13/245,636.
USPTO; Office Action dated Jul. 30, 2014 in U.S. Appl. No. 13/794,301.
USPTO; Advisory Action dated Jul. 30, 2014 in U.S. Appl. No. 13/411,281.
USPTO; Advisory Action dated Jul. 30, 2014 in U.S. Appl. No. 13/593,204.
USPTO; Advisory Action dated Jul. 31, 2014 in U.S. Appl. No. 13/476,910.
USPTO; Advisory Action dated Aug. 7, 2014 in U.S. Appl. No. 13/468,931.
Examination Report dated Aug. 11, 2014 in New Zealand Application No. 623019.
USPTO; Final Office Action dated Aug. 13, 2014 in U.S. Appl. No. 13/153,890.
USPTO; Office Action dated Aug. 14, 2014 in U.S. Appl. No. 13/794,145.
USPTO; Office Action dated Aug. 14, 2014 in U.S. Appl. No. 13/794,334.
USPTO; Office Action dated Aug. 15, 2014 in U.S. Appl. No. 13/794,374.
USPTO; Advisory Action dated Sep. 3, 2014 in U.S. Appl. No. 13/466,412.
USPTO; Advisory Action dated Sep. 3, 2014 in U.S. Appl. No. 13/467,503.
USPTO; Advisory Action dated Sep. 3, 2014 in U.S. Appl. No. 13/021,237.
USPTO; Advisory Action dated Sep. 3, 2014 in U.S. Appl. No. 12/857,389.
USPTO; Advisory Action dated Sep. 2, 2014 in U.S. Appl. No. 13/466,445.
USPTO; Final Office Action dated Mar. 1, 2013 in U.S. Appl. No. 13/439,768.
USPTO; Final Office Action dated Mar. 4, 2013 in U.S. Appl. No. 13/594,528.
USPTO; Final Office Action dated Mar. 6, 2013 in U.S. Appl. No. 13/188,693.
USPTO; Final Office Action dated Jan. 10, 2013 in U.S. Appl. No. 13/468,931.
USPTO; Final Office Action dated Jan. 31, 2013 in U.S. Appl. No. 13/411,281.
USPTO; Final Office Action dated Jan. 31, 2013 in U.S. Appl. No. 13/467,910.
USPTO; Final Office Action dated Feb. 14, 2013 in U.S. Appl. No. 13/021,237.
USPTO; Final Office Action dated Feb. 25, 2013 in U.S. Appl. No. 13/477,806.
USPTO; Office Action dated May 2, 2013 in U.S. Appl. No. 13/468,880.
International Preliminary Report on Patentability dated on May 7, 2013 in Application No. PCT/US2012/021648.
USPTO; Advisory Action dated May 9, 2013 in U.S. Appl. No. 13/477,806.
USPTO; Advisory Action dated May 22, 2013 in U.S. Appl. No. 13/188,693.

(56) References Cited

OTHER PUBLICATIONS

USPTO; Office Action dated May 23, 2013 in U.S. Appl. No. 13/734,693.
International Preliminary Report on Patentability dated on May 23, 2013 in Application No. PCT/US2012/027810.
International Preliminary Report on Patentability dated on Jun. 28, 2013 in Application No. PCT/US2012/027664.
USPTO; Advisory Action dated Jun. 6, 2013 in U.S. Appl. No. 13/466,445.
USPTO; Office Action dated Jul. 19, 2013 in U.S. Appl. No. 13/715,423.
USPTO; Office Action dated Aug. 14, 2013 in U.S. Appl. No. 11/779,734.
USPTO; Final Office Action dated Aug. 14, 2013 in U.S. Appl. No. 12/857,424.
USPTO; Office Action dated Aug. 26, 2013 in U.S. Appl. No. 13/889,305.
USPTO; Office Action dated Aug. 27, 2013 in U.S. Appl. No. 13/889,285.
USPTO; Final Office Action dated Aug. 28, 2013 in U.S. Appl. No. 13/443,100.
USPTO; Office Action dated Sep. 23, 2013 in U.S. Appl. No. 13/889,307.
USPTO; Advisory Action dated Oct. 7, 2013 in U.S. Appl. No. 12/857,424.
USPTO; Advisory Action dated Oct. 4, 2013 in U.S. Appl. No. 13/468,880.
USPTO; Final Office Action dated Oct. 30, 2013 in U.S. Appl. No. 11/779,734.
USPTO; Restriction Requirement dated Oct. 30, 2013 in U.S. Appl. No. 13/889,288.
USPTO; Final Office Action dated Oct. 31, 2013 in U.S. Appl. No. 13/889,305.
USPTO; Advisory Action dated Nov. 5, 2013 in U.S. Appl. No. 13/443,100.
USPTO; Final Office Action dated Nov. 5, 2013 in U.S. Appl. No. 13/889,285.
USPTO; Office Action dated Nov. 6, 2013 in U.S. Appl. No. 13/889,272.
USPTO; Office Action dated Nov. 22, 2013 in U.S. Appl. No. 13/889,299.
USPTO; Final Office Action dated Nov. 26, 2013 in U.S. Appl. No. 13/734,693.
USPTO; Notice of Allowance dated Dec. 17, 2013 in U.S. Appl. No. 13/594,528.
USPTO; Office Action dated Jan. 3, 2014 in U.S. Appl. No. 13/889,288.
USPTO; Advisory Action dated Jan. 14, 2014 in U.S. Appl. No. 13/889,285.
USPTO; Office Action dated Jan. 15, 2014 in U.S. Appl. No. 13/411,281.
USPTO; Final Office Action dated Jan. 29, 2014 in U.S. Appl. No. 13/889,307.
USPTO; Office Action dated Jan. 30, 2014 in U.S. Appl. No. 13/476,910.
USPTO; Office Action dated Feb. 3, 2014 in U.S. Appl. No. 13/593,204.
International Preliminary Report on Patentability dated Feb. 3, 2014 in Application No. PCT/US2013/028209.
USPTO; Advisory Action dated Feb. 5, 2014 in U.S. Appl. No. 13/734,693.
USPTO; Final Office Action dated Feb. 11, 2014 in U.S. Appl. No. 13/715,423.
USPTO; Office Action dated Feb. 12, 2014 in U.S. Appl. No. 13/468,931.
Golson, "Major League Baseball Rolling out Thousands of iBeacons for Opening Day," Jan. 30, 2014, pp. 2-3, retrieved from http://www.macrumors.com/2014/01/30/mlb-ibeacon-rollout/ on Feb. 12, 2014.
D Arthur, S Vassilvitskii, "k-means++: The advantages of careful seeding", Proceedings of the eighteenth annual ACM-SIAM symposium on Discrete algorithms, pp. 1027-1035, 2007, dl.acm.org.
AK Jain, "Data clustering: 50 years beyond K-means", Pattern Recognition Letters, 2010, pp. 1-33, Elsevier.
K-means++ Wikipedia Page, pp. 1-4, page last modified on Nov. 18, 2013, http://en.wikipedia.org/wiki/K-means++retrieved from the web Nov. 21, 2013.
USPTO; Advisory Action dated Apr. 30, 2014 in U.S. Appl. No. 13/715,423.
USPTO; Final Office Action dated May 5, 2014 in U.S. Appl. No. 13/411,281.
USPTO; Advisory Action dated Jun. 2, 2017 in U.S. Appl. No. 13/941,306.
USPTO; Notice of Allowance dated Jun. 9, 2017 in U.S. Appl. No. 14/464,439.
USPTO; Notice of Allowance dated Jun. 13, 2017 in U.S. Appl. No. 13/889,305.
USPTO; Notice of Allowance dated Jun. 13, 2017 in U.S. Appl. No. 14/464,474.
USPTO; Office Action dated Jun. 15, 2017 in U.S. Appl. No. 13/715,770.
Notice of Acceptance dated Jun. 21, 2017 in Australian Application No. 2016201509.
USPTO; Office Action dated Jun. 21, 2017 in U.S. Appl. No. 13/466,412.
USPTO; Notice of Allowance dated Jun. 29, 2017 in U.S. Appl. No. 13/889,299.
USPTO; Advisory Action dated Jul. 14, 2017 in U.S. Appl. No. 13/794,301.
USPTO; Notice of Allowance dated Jul. 25, 2017 in U.S. Appl. No. 13/411,281.
USPTO; Final Office Action dated Apr. 11, 2011 in U.S. Appl. No. 12/857,389.
USPTO; Final Office Action dated Apr. 5, 2011 in U.S. Appl. No. 12/857,424.
Todorova, Aleksandra, "The Best Rewards Programs," www.smartmoney.com, Sep. 2005, pp. 1-2.
Todorova, Aleksandra, "Capital One Tests a New Type of Debit Card," www.smartmoney.com, Jun. 2007, pp. 1-2.
Nickel, "Citi Thank You Redemptions: No Thanks," www.fivecentnickel.com, Sep. 2005.
American Express Website, Frequenty Asked Questions regarding American Express GiftCards, www.americanexpress.com/gift/faq from Feb. 25, 2005, 2 pages.
USPTO; Office Action dated Nov. 26, 2010 in U.S. Appl. No. 12/857,424.
USPTO; Office Action dated Nov. 26, 2010 in U.S. Appl. No. 12/857,389.
USPTO; Office Action dated Apr. 30, 2010 in U.S. Appl. No. 11/779,734.
USPTO; Advisory Action dated Jan. 6, 2011 in U.S. Appl. No. 11/779,734.
USPTO; Final Office Action dated Oct. 15, 2010 in U.S. Appl. No. 11/779,734.
USPTO; Advisory Action dated Jul. 11, 2011 in U.S. Appl. No. 12/857,389.
USPTO; Advisory Action dated Jul. 11, 2011 in U.S. Appl. No. 12/857,424.
PCT; International Search Report and Written Opinion dated Nov. 17, 2011 in Application No. PCT/US2011/047012.
USPTO; Office Action dated Nov. 10, 2011 in U.S. Appl. No. 13/153,890.
USPTO; Final Office Action dated Apr. 5, 2012 in U.S. Appl. No. 13/153,890.
PCT; International Search Report and Written Opinion dated May 7, 2012 in Application No. PCT/US2012/021648.
PCT; International Search Report and Written Opinion dated Jun. 19, 2012 in Application No. PCT/US2012/027810.
PCT; International Search Report and Written Opinion dated Jul. 6, 2012 in Application No. PCT/US2012/027664.
USPTO; Office Action dated Aug. 3, 2012 in U.S. Appl. No. 13/466,412.

(56) References Cited

OTHER PUBLICATIONS

USPTO; Office Action dated Aug. 17, 2012 in U.S. Appl. No. 13/466,445.
USPTO; Office Action dated Aug. 30, 2012 in U.S. Appl. No. 13/188,693.
USPTO; Office Action dated Aug. 30, 2012 in U.S. Appl. No. 13/468,880.
USPTO; Office Action dated Sep. 6, 2012 in U.S. Appl. No. 13/467,503.
USPTO; Office Action dated Sep. 14, 2012 in U.S. Appl. No. 13/476,910.
USPTO; Office Action dated Sep. 17, 2012 in U.S. Appl. No. 13/021,237.
USPTO; Office Action dated Oct. 9, 2012 in U.S. Appl. No. 13/468,931.
USPTO; Office Action dated Oct. 9, 2012 in U.S. Appl. No. 13/477,806.
USPTO; Office Action dated Oct. 12, 2012 in U.S. Appl. No. 13/439,768.
USPTO; Final Office Action dated Oct. 12, 2012 in U.S. Appl. No. 13/466,412.
USPTO; Office Action dated Oct. 15, 2012 in U.S. Appl. No. 13/594,528.
USPTO; Office Action dated Oct. 18, 2012 in U.S. Appl. No. 13/593,204.
USPTO; Office Action dated Oct. 19, 2012 in U.S. Appl. No. 13/411,281.
Dan Oshinsky, "Jet Blue's $1 Million Twitter Hashtag," Aug. 18, 2010, 4 pages, retrieved from: http://danoshinsky.com/2010/08/18/a-social-media-case-study-jetblue-vs-sun-country/.
USPTO; Office Action dated Nov. 15, 2012 in U.S. Appl. No. 13/443,100.
USPTO; Advisory Action dated Nov. 23, 2012 in U.S. Appl. No. 13/466,412.
International Preliminary Report on Patentability dated Dec. 7, 2012 in Application No. PCT/US2011/047012.
MG Seigler, "Want Everyone to See your Credit Card Transactions? of Course you do. Meet Blippy.", techcrunch.com, Dec. 11, 2009, 3 pages.
Tsotsis, Alexia, "The End of Blippy as We Know it." techcrunch.com, May 19, 2011, 3 pages.
USPTO; Office Action dated Jan. 4, 2013 in U.S. Appl. No. 13/593,204.
USPTO; Office Action dated Jan. 7, 2013 in U.S. Appl. No. 13/467,503.
USPTO; Office Action dated Jan. 7, 2013 in U.S. Appl. No. 13/466,445.
USPTO; Advisory Action dated Mar. 15, 2013 in U.S. Appl. No. 13/593,204.
USPTO; Advisory Action dated Mar. 18, 2013 in U.S. Appl. No. 13/467,503.
USPTO; Advisory Action dated Mar. 19, 2013 in U.S. Appl. No. 13/021,237.
USPTO; Advisory Action dated Mar. 19, 2013 in U.S. Appl. No. 13/468,931.
International Search Report and Written Opinion dated Mar. 22, 2013 in Application No. PCT/2013/028209.
USPTO; Advisory Action dated Mar. 28, 2013 in U.S. Appl. No. 13/411,281.
USPTO; Office Action dated Apr. 11, 2013 in U.S. Appl. No. 12/857,424.
USPTO; Office Action dated Apr. 12, 2013 in U.S. Appl. No. 13/467,910.
USPTO; Office Action dated Oct. 23, 2014 in U.S. Appl. No. 13/715,770.
USPTO; Advisory Action dated Oct. 24, 2014 in U.S. Appl. No. 13/153,890.
USPTO; Office Action dated Oct. 29, 2014 in U.S. Appl. No. 13/926,884.
USPTO; Office Action dated Oct. 29, 2014 in U.S. Appl. No. 13/926,895.
USPTO; Office Action dated Nov. 7, 2014 in U.S. Appl. No. 13/715,792.
USPTO; Office Action dated Nov. 7, 2014 in U.S. Appl. No. 13/715,423.
USPTO; Office Action dated Dec. 29, 2014 in U.S. Appl. No. 13/188,693.
USPTO; Office Action dated Jan. 9, 2015 in U.S. Appl. No. 13/468,880.
USPTO; Office Action dated Jan. 16, 2015 in U.S. Appl. No. 13/889,299.
USPTO; Advisory Action dated Sep. 5, 2014 in U.S. Appl. No. 13/889,305.
USPTO; Office Action dated Sep. 17, 2014 in U.S. Appl. No. 13/794,226.
USPTO; Office Action dated Sep. 26, 2014 in U.S. Appl. No. 13/477,806.
USPTO; Office Action dated Oct. 17, 2014 in U.S. Appl. No. 14/065,883.
USPTO; Office Action dated Oct. 17, 2014 in U.S. Appl. No. 11/779,734.
USPTO; Office Action dated Oct. 20, 2014 in U.S. Appl. No. 13/941,306.
USPTO; Office Action dated Oct. 3, 2014 in U.S. Appl. No. 12/857,424.
USPTO; Office Action dated Oct. 8, 2014 in U.S. Appl. No. 13/734,693.
USPTO; Office Action dated Oct. 9, 2014 in U.S. Appl. No. 13/926,789.
USPTO; Final Office Action dated Jan. 30, 2015 in U.S. Appl. No. 13/794,301.
USPTO; Final Office Action dated Feb. 11, 2015 in U.S. Appl. No. 14/065,883.
USPTO; Final Office Action dated Feb. 13, 2015 in U.S. Appl. No. 13/794,334.
Search Report and Written Opinion dated Feb. 16, 2015 in Singapore Application No. 11201400788P.
USPTO; Final Office Action dated Feb. 26, 2015 in U.S. Appl. No. 13/941,306.
USPTO; Office Action dated Feb. 27, 2015 in U.S. Appl. No. 13/443,100.
USPTO; Office Action dated Mar. 2, 2015 in U.S. Appl. No. 13/686,608.
USPTO; Final Office Action dated Mar. 13, 2015 in U.S. Appl. No. 13/794,374.
USPTO; Final Office Action dated Mar. 23, 2015 in U.S. Appl. No. 13/926,789.
Examination Report dated Mar. 24, 2015 in Australian Application No. 2012316453.
USPTO; Final Office Action dated Mar. 25, 2015 in U.S. Appl. No. 13/477,806.
USPTO; Final Office Action dated Mar. 25, 2015 in U.S. Appl. No. 13/794,226.
USPTO; Office Action dated Mar. 27, 2015 in U.S. Appl. No. 13/466,445.
USPTO; Final Office Action dated Apr. 3, 2015 in U.S. Appl. No. 13/926,884.
USPTO; Final Office Action dated Apr. 3, 2015 in U.S. Appl. No. 13/715,770.
USPTO; Final Office Action dated Apr. 7, 2015 in U.S. Appl. No. 13/926,895.
USPTO; Advisory Action dated Apr. 8, 2015 in U.S. Appl. No. 13/794,301.
USPTO; Office Action dated Apr. 8, 2015 in U.S. Appl. No. 13/021,237.
USPTO; Final Office Action dated Apr. 8, 2015 in U.S. Appl. No. 13/794,145.
USPTO; Final Office Action dated Apr. 13, 2015 in U.S. Appl. No. 13/734,693.
USPTO; Advisory Action dated Apr. 17, 2015 in U.S. Appl. No. 13/889,307.

(56) References Cited

OTHER PUBLICATIONS

USPTO; Final Office Action dated Apr. 17, 2015 in U.S. Appl. No. 13/715,792.
USPTO; Advisory Action dated Apr. 23, 2015 in U.S. Appl. No. 13/794,334.
USPTO; Advisory Action dated Apr. 23, 2015 in U.S. Appl. No. 14/065,883.
USPTO; Final Office Action dated Apr. 30, 2015 in U.S. Appl. No. 12/857,424.
Notice of Acceptance dated May 8, 2015 in New Zealand Application No. 623019.
USPTO; Advisory Action dated May 8, 2015 in U.S. Appl. No. 13/941,306.
USPTO; Final Office Action dated May 13, 2015 in U.S. Appl. No. 11/779,734.
USPTO; Office Action dated May 19, 2015 in U.S. Appl. No. 13/476,910.
USPTO; Office Action dated May 28, 2015 in U.S. Appl. No. 13/467,503.
USPTO; Advisory Action dated Jun. 3, 2015 in U.S. Appl. No. 13/794,226.
USPTO; Advisory Action dated Jun. 3, 2015 in U.S. Appl. No. 13/794,374.
USPTO; Office Action dated Jan. 15, 2016 in U.S. Appl. No. 13/889,299.
USPTO; Advisory Action dated Jan. 15, 2016 in U.S. Appl. No. 13/476,910.
USPTO; Office Action dated Jan. 20, 2016 in U.S. Appl. No. 13/889,307.
Pashtan, et al., "Personal Service Areas for Mobile Web Applications," IEEE Internet Computing, 2004, ieeexplore.ieee.org, 7 pages.
Pandey, et al., "Exploiting User Profiles to Support Differentiated Services in Next-Generation Wireless Networks," Network, IEEE, 2004, ieeexplore.ieee.org, 23 pages.
Liapis, et al., Implementing a Low-Cost, Personalized and Location Based Service for Delivering Advertisements to Mobile Users, Athens Information Technology, Oct. 2008, ieeexplore.ieee.org, 49 pages.
Park, et al., "Location-Based Recommendation System using Bayesian User's Preference Model in Mobile Devices," Ubiquitous Intelligence and Computing, 2007, Springer-Verlag Berlin Heidelberg, 10 pages.
Office Action dated Oct. 26, 2015 in Canadian Application No. 2,863,576.
Notice of Acceptance dated Nov. 30, 2015 in Australian Application No. 2012316453.
Office Action dated Dec. 10, 2015 in Canadian Application No. 2,849,271.
USPTO; Office Action dated Feb. 1, 2016 in U.S. Appl. No. 13/443,100.
USPTO; Final Office Action dated Feb. 2, 2016 in U.S. Appl. No. 13/926,789.
USPTO; Final Office Action dated Feb. 2, 2016 in U.S. Appl. No. 13/941,306.
USPTO; Final Office Action dated Feb. 9, 2016 in U.S. Appl. No. 13/794,374.
USPTO; Final Office Action dated Feb. 9, 2016 in U.S. Appl. No. 13/794,272.
USPTO; Final Office Action dated Feb. 11, 2016 in U.S. Appl. No. 13/794,334.
USPTO; Final Office Action dated Feb. 11, 2016 in U.S. Appl. No. 13/926,884.
USPTO; Final Office Action dated Feb. 12, 2016 in U.S. Appl. No. 13/926,895.
USPTO; Office Action dated Feb. 12, 2016 in U.S. Appl. No. 13/593,204.
USPTO; Office Action dated Feb. 19, 2016 in U.S. Appl. No. 13/468,931.

Office Action dated Feb. 29, 2016 in Canadian Application No. 2,874,582.
USPTO; Office Action dated Feb. 29, 2016 in U.S. Appl. No. 13/686,608.
USPTO; Office Action dated Mar. 4, 2016 in U.S. Appl. No. 13/466,412.
USPTO; Office Action dated Mar. 4, 2016 in U.S. Appl. No. 13/794,226.
USPTO; Office Action dated Mar. 7, 2016 in U.S. Appl. No. 12/857,389.
USPTO; Office Action dated Mar. 17, 2016 in U.S. Appl. No. 13/889,305.
USPTO; Advisory Action dated Mar. 18, 2016 in U.S. Appl. No. 13/439,768.
USPTO; Advisory Action dated Mar. 18, 2016 in U.S. Appl. No. 13/411,281.
USPTO; Advisory Action dated Mar. 25, 2016 in U.S. Appl. No. 13/794,301.
USPTO; Advisory Action dated Mar. 28, 2016 in U.S. Appl. No. 14/065,883.
White, "Deals as Debit Rewards? Bank of America Brings Back Debit Card Rewards With a Twist," Jan. 25, 2012, 2 pages, retrieved from http://moneyland.time.com/2012/01/25/deals-as-debit-rewards-bank-of-america-brings-back-debit-card-rewards-with-a-twist/.
Owen, et al., "Improving the Value and Performance of Online Offers," A First Data White Paper, First Data Corporation, 2012, 10 pages.
Noyes, "Card-Linked Offers Update," Transaction World Magazine, Jul. 2012, 2 pages.
Examination Report dated Feb. 26, 2016 in Australian Application No. 2015201925.
USPTO; Office Action dated Mar. 31, 2016 in U.S. Appl. No. 13/889,288.
USPTO; Final Office Action dated Apr. 14, 2016 in U.S. Appl. No. 13/715,770.
USPTO; Office Action dated Apr. 15, 2016 in U.S. Appl. No. 13/188,693.
USPTO; Advisory Action dated Apr. 15, 2016 in U.S. Appl. No. 13/926,789.
USPTO; Notice of Allowance dated Apr. 18, 2016 in U.S. Appl. No. 13/734,693.
USPTO; Advisory Action dated Apr. 21, 2016 in U.S. Appl. No. 13/794,272.
USPTO; Advisory Action dated Apr. 22, 2016 in U.S. Appl. No. 13/794,374.
Office Action dated Apr. 25, 2016 in Canadian Application No. 2,888,085.
USPTO; Advisory Action dated May 2, 2016 in U.S. Appl. No. 13/926,884.
USPTO; Advisory Action dated May 2, 2016 in U.S. Appl. No. 13/794,334.
USPTO; Office Action dated May 16, 2016 in U.S. Appl. No. 13/153,890.
USPTO; Office Action dated May 19, 2016 in U.S. Appl. No. 13/926,895.
Ghose, et al., "Opinion Mining using Econometrics: A case study on Reputation Systems", Department of Information, Operations, and Management Sciences, Annual Meeting, 2007.
Pang, et al., "Opinion mining and sentiment analysis", Foundations and trends in information retrieval, vol. 2, No. 1-2 (2008) 1-135.
Pavlovic, "Dynamics, robustness and fragility of trust", Formal Aspects in Secruity and Trust, 2009—Springer.
Pocket-lint, Apple's iBeacons explained: What it is and why it matters, retrieved from internet on Feb. 21, 2017, http://web.archive.org/web/20130925141212/http://www.pocket-lint.com/news/123730-apple-sibeacons-explained-what-it-is-and-why-it-matters> published on Sep. 25, 2013 as per Wayback Machine, 10 pages.
Office Action dated Feb. 1, 2017 in U.S. Appl. No. 15/334,490.
Final Office Action dated Mar. 22, 2017 in U.S. Appl. No. 15/334,490.

(56) References Cited

OTHER PUBLICATIONS

Office Action dated Jan. 11, 2017 in Canadian Application No. 2,849,271.
Office Action dated Feb. 15, 2017 in Canadian Application No. 2,874,582.
USPTO; Notice of Allowance dated Mar. 10, 2017 in U.S. Appl. No. 13/467,503.
USPTO; Advisory Action dated Mar. 10, 2017 in U.S. Appl. No. 13/466,445.
USPTO; Advisory Action dated Mar. 13, 2017 in U.S. Appl. No. 13/466,412.
Aloni, U.S. Appl. No. 15/495,428, filed Apr. 24, 2017 and entitled Offers Selected During Authorization.
USPTO; Notice of Allowance dated Mar. 15, 2017 in U.S. Appl. No. 13/476,910.
USPTO; Advisory Action dated Mar. 23, 2017 in U.S. Appl. No. 13/443,100.
Examination Report dated Mar. 23, 2017 in Australian Application No. 2016201509.
USPTO; Notice of Allowance dated Mar. 24, 2017 in U.S. Appl. No. 13/794,334.
USPTO; Final Office Action dated Mar. 27, 2017 in U.S. Appl. No. 13/794,374.
Notice of Allowance dated Mar. 29, 2017 in Canadian Application No. 2,888,085.
USPTO; Advisory Action dated Mar. 29, 2017 in U.S. Appl. No. 13/715,770.
USPTO; Office Action dated Apr. 7, 2017 in U.S. Appl. No. 13/889,272.
USPTO; Office Action dated Apr. 10, 2017 in U.S. Appl. No. 13/443,100.
USPTO; Office Action dated Apr. 12, 2017 in U.S. Appl. No. 13/794,272.
USPTO; Office Action dated Apr. 13, 2017 in U.S. Appl. No. 13/466,412.
USPTO; Notice of Allowance dated Apr. 17, 2017 in U.S. Appl. No. 13/466,445.
USPTO; Notice of Allowance dated Apr. 20, 2017 in U.S. Appl. No. 13/889,288.
USPTO; Final Office Action dated Apr. 20, 2017 in U.S. Appl. No. 14/065,883.
USPTO; Final Office Action dated Apr. 20, 2017 in U.S. Appl. No. 13/941,306.
USPTO; Notice of Allowance dated Apr. 24, 2017 in U.S. Appl. No. 13/926,895.
USPTO; Final Office Action dated May 17, 2017 in U.S. Appl. No. 14/464,474.
Morris, U.S. Appl. No. 15/456,777, filed Mar. 13, 2017 and entitled Purchase Instructions Complying With Reservation Instructions.
USPTO; Final Office Action dated Apr. 28, 2017 in U.S. Appl. No. 13/153,890.
USPTO; Final Office Action dated Apr. 28, 2017 in U.S. Appl. No. 13/889,305.
USPTO; Final Office Action dated May 4, 2017 in U.S. Appl. No. 13/794,301.
USPTO; Final Office Action dated May 17, 2017 in U.S. Appl. No. 13/411,281.
USPTO; Advisory Action dated May 17, 2017 U.S. Appl. No. 13/794,374.
USPTO; Final Office Action dated May 17, 2017 in U.S. Appl. No. 14/464,439.
USPTO; Office Action dated Oct. 11, 2016 in U.S. Appl. No. 13/794,226.
USPTO; Office Action dated Oct. 11, 2016 in U.S. Appl. No. 13/794,301.
USPTO; Advisory Action dated Oct. 20, 2016 in U.S. Appl. No. 13/889,307.
USPTO; Advisory Action dated Oct. 27, 2016 in U.S. Appl. No. 12/857,424.
Supplementary Examination Report dated Oct. 17, 2016 in New Zealand Application No. 11201400788P.
USPTO; Advisory Action dated Oct. 31, 2016 in U.S. Appl. No. 13/889,288.
USPTO; Advisory Action dated Nov. 1, 2016 in U.S. Appl. No. 13/153,890.
USPTO; Final Office Action dated Nov. 1, 2016 in U.S. Appl. No. 13/926,895.
Notice of Eligibility for Grant dated Nov. 1, 2016 in Singapore Application No. 11201400788P.
USPTO; Notice of Allowance dated Nov. 2, 2016 in U.S. Appl. No. 13/477,806.
USPTO; Advisory Action dated Nov. 3, 2016 in U.S. Appl. No. 14/065,883.
USPTO; Advisory Action dated Nov. 4, 2016 in U.S. Appl. No. 13/443,100.
USPTO; Final Office Action dated Nov. 4, 2016 in U.S. Appl. No. 13/794,334.
USPTO; Office Action dated Nov. 10, 2016 in U.S. Appl. No. 13/476,910.
USPTO; Final Office Action dated Nov. 10, 2016 in U.S. Appl. No. 14/284,817.
USPTO; Advisory Action dated Nov. 15, 2016 in U.S. Appl. No. 13/889,299.
USPTO; Advisory Action dated Nov. 16, 2016 in U.S. Appl. No. 13/941,306.
USPTO; Notice of Allowance dated Nov. 17, 2016 in U.S. Appl. No. 12/857,424.
USPTO; Final Office Action dated Nov. 17, 2016 in U.S. Appl. No. 13/188,693.
USPTO; Notice of Allowance dated Nov. 18, 2016 in U.S. Appl. No. 13/468,931.
USPTO; Office Action dated Nov. 18, 2016 in U.S. Appl. No. 13/443,100.
Examination Report dated Nov. 22, 016 in Australian Application No. 2015201925.
USPTO; Office Action dated Nov. 28, 2016 in U.S. Appl. No. 14/065,883.
USPTO; Office Action dated Dec. 2, 2016 in U.S. Appl. No. 13/153,890.
USPTO; Office Action dated Dec. 14, 2016 in U.S. Appl. No. 13/941,306.
USPTO; Advisory Action dated Dec. 14, 2016 in U.S. Appl. No. 13/794,334.
USPTO; Final Office Action dated Dec. 15, 2016 in U.S. Appl. No. 13/468,880.
USPTO; Office Action dated Dec. 15, 2016 in U.S. Appl. No. 13/411,281.
USPTO; Office Action dated Dec. 20, 2016 in U.S. Appl. No. 13/889,305.
USPTO; Office Action dated Jan. 4, 2017 in U.S. Appl. No. 13/794,334.
USPTO; Office Action dated Jan. 13, 2017 in U.S. Appl. No. 13/794,374.
USPTO; Advisory Action dated Dec. 8, 2016 in U.S. Appl. No. 13/926,895.
Examination Report dated Jan. 11, 2017 in Australian Application No. 2016201509.
USPTO; Final Office Action dated Jan. 19, 2017 in U.S. Appl. No. 13/466,445.
USPTO; Final Office Action dated Jan. 20, 2017 in U.S. Appl. No. 13/467,503.
Examination Report dated Jan. 23, 2017 in Australian Application No. 2015201925.
USPTO; Office Action dated Jan. 23, 2017 in U.S. Appl. No. 14/464,439.
USPTO; Advisory Action dated Jan. 25, 2017 in U.S. Appl. No. 14/284,817.
USPTO; Office Action dated Jan. 30, 2017 in U.S. Appl. No. 14/464,474.
USPTO; Notice of Allowance dated Feb. 2, 2017 in U.S. Appl. No. 12/857,389.

(56) References Cited

OTHER PUBLICATIONS

USPTO; Advisory Action dated Feb. 7, 2017 in U.S. Appl. No. 13/188,693.
USPTO; Final Office Action dated Feb. 8, 2017 in U.S. Appl. No. 13/715,770.
USPTO; Final Office Action dated Feb. 9, 2017 in U.S. Appl. No. 13/443,100.
USPTO; Final Office Action dated Feb. 14, 2017 in U.S. Appl. No. 13/466,412.
USPTO; Notice of Allowance dated Feb. 14, 2017 in U.S. Appl. No. 13/794,226.
USPTO; Notice of Allowance dated Feb. 15, 2017 in U.S. Appl. No. 13/794,145.
USPTO; Notice of Allowance dated Feb. 16, 2017 in U.S. Appl. No. 13/889,307.
Examination Report dated Feb. 24, 2017 in Australian Application No. 2015201925.
USPTO; Advisory Action dated Feb. 27, 2017 in U.S. Appl. No. 13/468,880.
USPTO; Final Office Action dated Feb. 27, 2017 in U.S. Appl. No. 13/926,895.
Resnick, et al., "Recommender Systems", Mar. 1997, Commuincations of the ACM, vol. 40,No. 3, pp. 56-58.
Ricci, et al.; "Recommendation and Personalization in eCommerce", Proceedings of the AH'2002 Workshop on Recommendation and Personalization in eCommerce, Malaga, Spain, May 28, 2002, pp. 1-160.
USPTO; Office Action dated Jun. 3, 2016 in U.S. Appl. No. 14/065,883.
USPTO; Office Action dated Jun. 3, 2016 in U.S. Appl. No. 12/857,424.
USPTO; Notice of Allowance dated Jun. 3, 2016 in U.S. Appl. No. 13/593,204.
USPTO; Final Office Action dated Jun. 8, 2016 in U.S. Appl. No. 12/857,389.
USPTO; Office Action dated Jun. 9, 2016 in U.S. Appl. No. 13/926,895.
USPTO; Final Office Action dated Jun. 10, 2016 in U.S. Appl. No. 13/466,412.
USPTO; Final Office Action dated Jun. 13, 2016 in U.S. Appl. No. 13/468,931.
USPTO; Final Office Action dated Jun. 15, 2016 in U.S. Appl. No. 13/686,608.
USPTO; Office Action dated Jun. 17, 2016 in U.S. Appl. No. 13/468,880.
USPTO; Office Action dated Jun. 17, 2016 in U.S. Appl. No. 13/941,306.
USPTO; Final Office Action dated Jun. 17, 2016 in U.S. Appl. No. 13/794,145.
USPTO; Advisory Action dated Jun. 24, 2016 in U.S. Appl. No. 13/715,770.
USPTO; Final Office Action dated Jul. 1, 2016 in U.S. Appl. No. 13/794,226.
USPTO; Final Office Action dated Jul. 5, 2016 in U.S. Appl. No. 13/889,305.
USPTO; Advisory Action dated Jul. 6, 2016 in U.S. Appl. No. 13/468,931.
USPTO; Office Action dated Jul. 7, 2016 in U.S. Appl. No. 14/284,817.
USPTO; Notice of Allowance dated Jul. 13, 2016 in U.S. Appl. No. 11/779,734.
USPTO; Final Office Action dated Jul. 28, 2016 in U.S. Appl. No. 13/889,272.
USPTO; Final Office Action dated Aug. 12, 2016 in U.S. Appl. No. 13/889,299.
"What is a token in programming?" Quora, pp. 1-3, retrieved from https://www.quora.com/What-is-a-token-in-programming on May 31, 2016.
USPTO; Notice of Allowance dated May 25, 2016 in U.S. Appl. No. 13/439,768.
USPTO; Office Action dated May 26, 2016 in U.S. Appl. No. 13/477,806.
IP Australia; Examination Report dated Aug. 3, 2016 in Australian Application No. 2015201925.
USPTO; Advisory Action dated Aug. 17, 2016 in U.S. Appl. No. 12/857,389.
CIPO; Notice of Allowance dated Aug. 18, 2016 in Canadian Application No. 2,863,576.
SPTO; Advisory Action dated Aug. 18, 2016 in U.S. Appl. No. 13/466,412.
USPTO; Notice of Allowance dated Aug. 24, 2016 in U.S. Appl. No. 13/021,237.
USPTO; Advisory Action dated Aug. 24, 2016 in U.S. Appl. No. 13/686,608.
USPTO; Office Action dated Aug. 24, 2016 in U.S. Appl. No. 13/794,334.
USPTO; Final Office Action dated Aug. 25, 2016 in U.S. Appl. No. 13/466,445.
USPTO; Advisory Action dated Aug. 25, 2016 in U.S. Appl. No. 13/794,145.
USPTO; Final Office Action dated Aug. 26, 2016 in U.S. Appl. No. 13/443,100.
USPTO; Final Office Action dated Aug. 30, 2016 in U.S. Appl. No. 13/889,307.
USPTO; Office Action dated Sep. 2, 2016 in U.S. Appl. No. 13/467,503.
USPTO; Final Office Action dated Sep. 2, 2016 in U.S. Appl. No. 12/857,424.
USPTO; Final Office Action dated Sep. 7, 2016 in U.S. Appl. No. 13/153,890.
USPTO; Notice of Allowance dated Sep. 9, 2016 in U.S. Appl. No. 13/926,789.
USPTO; Advisory Action dated Sep. 12, 2016 in U.S. Appl. No. 13/889,305.
USPTO; Final Office Action dated Sep. 14, 2016 in U.S. Appl. No. 13/477,806.
USPTO; Advisory Action dated Sep. 21, 2016 in U.S. Appl. No. 13/889,272.
USPTO; Final Office Action dated Sep. 22, 2016 in U.S. Appl. No. 13/889,288.
USPTO; Advisory Action dated Sep. 22, 2016 in U.S. Appl. No. 13/794,226.
USPTO; Final Office Action dated Sep. 23, 2016 in U.S. Appl. No. 14/065,883.
USPTO; Office Action dated Sep. 29, 2016 in U.S. Appl. No. 12/857,389.
USPTO; Office Action dated Sep. 29, 2016 in U.S. Appl. No. 13/466,412.
USPTO; Office Action dated Oct. 7, 2016 in U.S. Appl. No. 13/715,770.
USPTO; Notice of Allowance dated Oct. 11, 2016 in U.S. Appl. No. 13/926,884.
USPTO; Office Action dated Oct. 11, 2016 in U.S. Appl. No. 13/794,145.
USPTO; Advisory Action dated Oct. 3, 2017 in U.S. Appl. No. 13/794,272.
USPTO; Notice of Allowance dated Dec. 13, 2017 in U.S. Appl. No. 13/941,306.
Lispto; Non-Final Office Action dated Oct. 6, 2017 in U.S. Appl. No. 13/188,693.
USPTO; Non-Final Office Action dated Oct. 6, 2017 in U.S. Appl. No. 13/468,880.
USPTO; Final Office Action dated Oct. 25, 2017 in U.S. Appl. No. 13/889,272.
USPTO; Notice of Allowance dated Oct. 30, 2017 in U.S. Appl. No. 13/794,374.
USPTO; Advisory Action dated Nov. 9, 2017 in U.S. Appl. No. 13/466,412.
USPTO; Non-Final Office Action dated Nov. 14, 2017 in U.S. Appl. No. 14/284,817.
USPTO; Advisory Action dated Nov. 28, 2017 in U.S. Appl. No. 13/889,272.

(56) References Cited

OTHER PUBLICATIONS

USPTO; Final Office Action dated Dec. 11, 2017 in U.S. Appl. No. 13/715,423.
USPTO; Final Office Action dated Aug. 11, 2017 in U.S. Appl. No. 13/443,100.
USPTO; Final Office Action dated Aug. 18, 2017 in U.S. Appl. No. 13/794,272.
USPTO; Non-Final Office Action dated Aug. 30, 2017 in U.S. Appl. No. 13/941,306.
USPTO; Final Office Action dated Sep. 20, 2017 in U.S. Appl. No. 13/466,412.
USPTO; Non-Final Office Action dated Dec. 22, 2017 in U.S. Appl. No. 15/139,176.
USPTO; Non-Final Office Action dated Jan. 11, 2018 in U.S. Appl. No. 15/195,781.
USPTO; Final Office Action dated Jan. 18, 2018 in U.S. Appl. No. 13/715,770.
Australian Examination Report dated Jan. 19, 2018 in Australian Application No. 2017201307.
USPTO; Non-Final Office Action dated Jan. 23, 2018 in U.S. Appl. No. 15/166,086.
USPTO; Non-Final Office Action dated Feb. 2, 2018 in U.S. Appl. No. 14/928,680.
USPTO; Advisory Action dated Feb. 28, 2018 in U.S. Appl. No. 13/715,770.
USPTO; Non-Final Action dated Mar. 9, 2018 in U.S. Appl. No. 13/794,301.
USPTO; Advisory Action dated Mar. 22, 2018 in U.S. Appl. No. 13/715,423.
USPTO; Non-Final Office Action dated Apr. 5, 2018 in U.S. Appl. No. 15/216,264.
USPTO; Final Office Action dated Apr. 6, 2018 in U.S. Appl. No. 13/468,880.
USPTO; Final Office Action dated Apr. 25, 2018 in U.S. Appl. No. 15/195,781.
Ying Cai et al., Design, Analysis, and Implentation of a Large-scale Real-time Location-based Information Sharing System, pp. 106-117, Proceedings of the 6th International Conference on . . . , 2008, dl.acm.org.
Moon-Hee Parket et al., Location-Based Recommendation System Using Bayesian User's Preference Model in Mobile Devices, International Conference on Ubiquitous, pp. 1130-1139, 2007, Spring-Verlag Berlin Heidelberg.
Rashid, O. et. Al., "Providing Location based information/ advertising for existing mobile phone users", Personal and Ubiquitous Computing, 2008, pp. 3-10, Springer.
Singhal, M., et al., "Implementation of Location based servcies in Android Using GPS and Web Servies", IJCSI International Journal of Computer Science Issues, vol. 9, Issue 1, No. 2, Jan. 2012, pp. 237-242, pdfs.semanticscholar.org.
"Standard Score", Wikipedia.org entry, retrieved on Nov. 30, 2017 from http://en.wikipedia.org/wiki/Standard_score, pp. 1-4.
Mahmoud, Q., "Provisioning Context-Aware Advertisements to Wireless Mobile Users", pp. 669-672, Multimedia and Expo, 2006 IEEE International, 2006.
Dhar, S. et al., "Challenges and Business Models for Mobile Location-Based Servies and Advertising", Communications of the ACM, May 2011, vol. 54, No. 5, pp. 121-129.
Lynn, Michael et al., "Gratitude and Fratuity: A Meta-Analysis of Research on the Service-tipping Relationship", Cornel University of Hotel Administraiton, 2000, Journal of Socio-Economics 29, pp. 1-18.
Canadian Intellectual Property Office, Canadian Examination Search Report dated Jan. 31, 2018 in Application No. 2,849,271.
USPTO; Final Office Action dated May 9, 2018 in U.S. Appl. No. 15/139,176.
USPTO; Non-Finai Office action dated May 18, 2018 in U.S. Appl. No. 15/018,623.
USPTO; Final Office Action dated May 23, 2018 in U.S. Appl. No. 15/166,086.
Uspto; Non-Final Office action dated May 24, 2018 in U.S. Appl. No. 14/928,905.

\* cited by examiner

EXPENDITURES BASED ON AD IMPRESSIONS

CROSS REFERENCE TO RELATED APPLICATIONS

This application is a continuation of, claims priority to and the benefit of, U.S. Ser. No. 14/464,474 filed Aug. 20, 2014 and entitled "Systems and Methods for Targeting Ad Impressions." The '474 application claims the benefit of, priority to and is a continuation of, U.S. Ser. No. 13/245,636 filed Sep. 26, 2011 and entitled "Systems and Methods for Targeting Ad Impressions," which issued on Sep. 30, 2014 as U.S. Pat. No. 8,849,699. All of above-referenced applications are incorporated herein by reference in their entirety for any purpose.

BACKGROUND

Field

The present disclosure generally relates to targeting marketing, and more particularly, to methods, systems, and articles of manufacture for targeting ad impressions to customers and consumers based upon spend. The methods, systems, and articles described herein are further directed to the measurement of the effectiveness and relevance of those ad impressions.

Related Art

Businesses frequently store a variety of information relating to the interests and activities of their customers. For example, transaction account companies (e.g., American Express, Visa, Discover, etc.) typically maintain information about the purchasing habits and/or product affinities of their customers. Transaction account issuing companies and payment processors may use this information to target advertisements, promotional offers, discounts, and the like to their customers. Thus, the information that transaction account companies collect about their customers enables a more relevant provision of services to customers.

Although transaction account companies and payment processors often have access to a variety of purchasing information, this information is typically unavailable to merchants. Thus, merchants are unable to incorporate into their marketing efforts data associated with the actual shopping activities of transaction account customers. Merchants are therefore limited, due to an incomplete understanding of the interests of these customers, in their efforts to provide relevant and useful offers and services.

Accordingly, an improved system for understanding the interests and needs of transaction account customers is needed. This system should permit merchants to target marketing and other promotional offers to transaction account customers based on the purchasing activities of those customers. The system should further permit transaction account companies to measure the success and value of the system, particularly from a customer's standpoint. In other words, the system should incorporate an ability to evaluate the actual relevance of advertisements, offers, promotions, and discounts that are served or delivered to customers.

Finally, the system should seek to preserve the privacy of the customers it aims to serve. To this end, the system should incorporate one or more methods for maintaining the anonymity of customers.

SUMMARY

The present disclosure includes a system, method, and article of manufacture for targeting ad impressions. In various embodiments, a list of customer records may be transmitted to a service provider system that identifies a matched customer and installs a cookie on a web client associated with the matched customer. The system may further receive a campaign request from a merchant and transmit the campaign request to the service provider system which may add a flag to the cookie based on the campaign request as well as instruct a media buyer system to bid on an ad impression for the matched customer based on the flag. The system may further receive an expenditure associated with the matched customer who received the ad impression and compare the expenditure to an expenditure associated with a customer who did not receive targeted ad impression but fits parameters associated with the campaign request.

In various embodiments, a report showing the results of this comparison may be generated and provided to a merchant associated with the campaign request. A report showing a click through associated with matched customers who received targeted ad impressions may also be generated. A click through may be shown in comparison to a click through associated with customers who did not receive targeted ad impressions In various embodiments, the system, method, and/or article of manufacture may further permit, via the web client, the matched customer who received the targeted ad impression to select a type of ad impression in which the matched customer is interested. The matched customer may be further permitted to remove a flag from the cookie in response to a selection by the customer of a type of ad impression in which the matched customer is not interested. The system, method, and/or article may further comprise receiving an updated campaign request from the merchant in response to at least one of: a report showing the results of the comparing and a click through associated with customers who received targeted ad impressions.

BRIEF DESCRIPTION OF THE DRAWINGS

The features and advantages of the present disclosure will become more apparent from the detailed description set forth below when taken in conjunction with the drawings. The left-most digit of a reference number identifies the drawing in which the reference number first appears.

DETAILED DESCRIPTION

Figure 1:
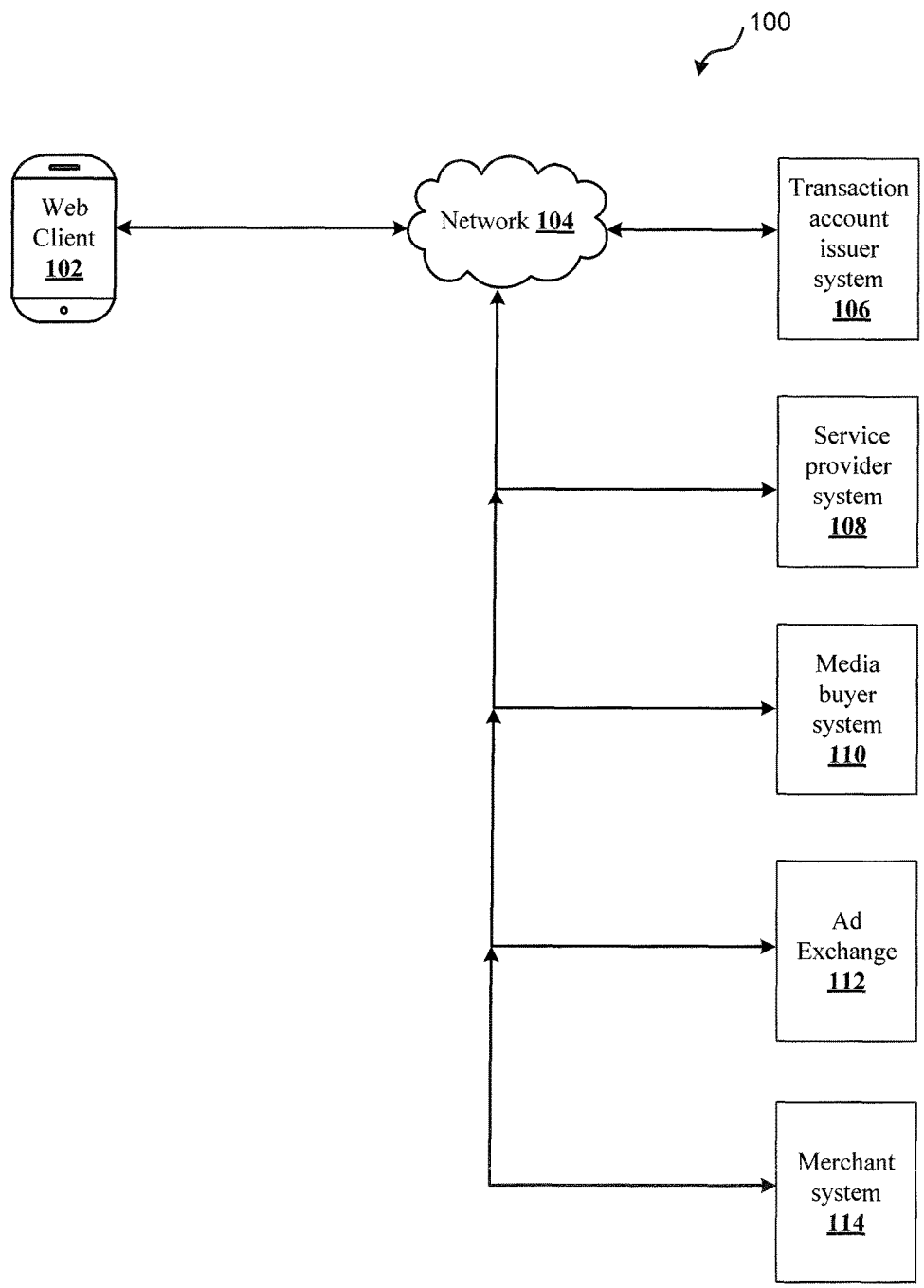
FIG. 1 shows an exemplary system diagram in accordance with various embodiments.

The detailed description of exemplary embodiments herein makes reference to the accompanying drawings, which show the exemplary embodiments by way of illustration and their best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Phrases and terms similar to "transaction account" or "credit account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

The terms "payment vehicle," "financial transaction instrument," "transaction instrument" and/or the plural form of these terms may be used interchangeably throughout to refer to a financial instrument.

Phrases and terms similar to "item" may include any good, service, information, experience, data, content, access, rental, lease, contribution, account, credit, debit, benefit, right, reward, points, coupons, credits, monetary equivalent, anything of value, something of minimal or no value, monetary value, non-monetary value and/or the like.

Phrases and terms similar to "merchant," "supplier" or "seller" may include any entity that receives payment or other consideration. For example, a merchant may request payment for items sold to a customer or consumer who holds an account with a transaction account issuer.

Phrases and terms similar to "customer," or "transaction account customer" may include any entity that purchases items using a transaction account. Thus, for example, a transaction account customer may purchase, lease, rent, barter or otherwise obtain items from a supplier and pay the supplier using a transaction account.

As used herein, a "consumer" may include any entity that provides payment or other consideration in exchange for the sale of one or more items.

As used herein, "personally identifying information," or "PII," may comprise any information that may be used to identify an individual (e.g., a consumer, a customer, etc.) For instance, in various embodiments, PII may comprise an individual's name, address, telephone number, email address, gender, birth date, social security number, a unique identifier associated with the individual, one or more transaction accounts, demographic data, and the like.

As used herein, "internal data" may include any data a transaction account issuer possesses or acquires pertaining to a particular customer or consumer. Internal data may be gathered before, during, or after a relationship between the transaction account issuer and the transaction account holder (e.g., the consumer or buyer). Such data may include customer or consumer PII, which may include demographic data. Demographic data may include any data pertaining to a customer or consumer. Demographic data may include name, address, telephone number, email address, employer and social security number. Transactional data is any data pertaining to the particular transactions in which a customer or consumer engages during any given time period. Transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Payment data includes any data pertaining to a customer's or consumer's history of paying debt obligations. Payment data may include payment dates, payment amounts, balance amount, and credit limit. Internal data may further comprise records of customer or consumer service calls, complaints, requests for credit line increases, questions, and comments. A record of a customer or consumer service call includes, for example, date of call, reason for call, and any transcript or summary of the actual call.

As used herein, an "ad impression" or "advertisement impression" may comprise an appearance of an advertisement on a web page. An ad impression may be based upon a "creative," which may comprise a template or file which forms the basis for an ad impression. That is, for example, a plurality of ad impressions may be served based upon a single creative.

Phrases and terms similar to "cookie," "HTTP cookie," "web cookie," "browser cookie" and the like include one or more files and/or compilations of data transmitted by a website or web-server to a destination machine (e.g., a web client). Cookies may comprise a variety of data, including state data, session data, shopping cart data, customer preference data, and the like. A cookie may be stored by a web client and returned later to the website or web-server with which the cookie originated (i.e., the website or web-server that set the cookie). A cookie may also be transmitted to a non-originating website or web-server (i.e., a website or web server that did not set the cookie).

Further, as used herein, a cookie may contain a "cookie ID." A cookie ID may comprise any data that uniquely identifies a consumer, customer, and/or web client. Thus, a cookie ID may comprise a number, an alphanumeric string, a purely alphabetical string, a single character, and/or any other data element or compilation that may be used to uniquely identify consumer, customer, and/or web client. A cookie ID may further serve to anonymously identify a consumer, customer, and/or web client, in which case the cookie ID may not contain any PII associated with the consumer, customer, and/or web client.

A system for targeting ad impressions is disclosed. In various embodiments, a system for targeting ad impressions to customers based upon actual spend data is disclosed. Referring to FIG. 1, a system 100 for targeting ad impressions is disclosed. System 100 may comprise a web client 102, a network 104, a transaction account issuer system 106, a service provider system 108, a media buyer system 110, an advertisement exchange ("ad exchange") system 112, and/or a merchant system 114.

A web client 102 may comprise any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web client may run Microsoft Internet Explorer, Mozilla Firefox, Google Chrome, Apple Safari, or any other of the myriad software packages available for browsing the internet.

In various embodiments, a web client 102 may or may not be in direct contact with an application server. For example, a web client 102 may access the services of an application server through another server and/or hardware component, which may have a direct or indirect connection to an Internet server. For example, a web client 102 may communicate with an application server via a load balancer. In various embodiments, access is through a network or the Internet through a commercially available web browser software package.

A web client 102 may include an operating system (e.g., Windows NT, 95/98/2000/CE/Mobile, OS2, UNIX, Linux, Solaris, MacOS, PalmOS, etc.) as well as various conventional support software and drivers typically associated with computers. A web client 102 may include any suitable personal computer, network computer, workstation, personal digital assistant, cellular phone, smart phone, minicomputer, mainframe or the like. A web client 102 can be in a home or business environment with access to a network. In various embodiments, access is through a network or the Internet through a commercially available web-browser software package. A web client 102 may implement security protocols such as Secure Sockets Layer (SSL) and Transport Layer Security (TLS). A web client 102 may implement several application layer protocols including http, https, ftp, and sftp.

Web client 102, transaction account issuer system 106, service provider system 108, media buyer system 110, advertising exchange ("ad exchange") 112, and/or merchant system 114, may communicate via a network 104. As used herein, the term "network" may include any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network 104 is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network 104 via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network 104 may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

Transaction account issuer system 106 may comprise a computer-based system owned and/or operated by a transaction account issuer (e.g., American Express). A transaction account issuer system 106 may comprise one or more databases, one or more web servers, one or more application servers, and the like. A transaction account issuer system 106 may comprise internal data, as described elsewhere herein. For instance, a transaction account issuer system 106 may comprise a database that stores data associated with one or more transaction account customers.

Service provider system 108 may comprise a computer-based system owned and/or operated by a service provider (e.g., a provider of consumer data). A service provider system 108 may comprise one or more databases, one or more web servers, one or more application servers, and the like. In various embodiments, a service provider system 108 may comprise data associated with one or more online consumers. For example, a service provider system 108 may comprise PII associated with one or more consumers, one or more cookie and/or cookie data associated with one or more consumers, and the like. In various embodiments, a service provider system 108 may communicate with a transaction account issuer system 106 and/or a media buyer system 110.

Media buyer system 110 may comprise a computer-based system owned and/or operated by a media buyer (e.g., a purchaser of advertisements or ad impressions, as described elsewhere herein). A media buyer system 110 may comprise one or more databases, one or more web servers, one or more application servers, and the like. In various embodiments, a media buyer system 110 may communicate with an advertisement exchange 112 (or, "ad exchange"), a service provider system 108, and/or a transaction account issuer system 106 for the purchase and delivery of one or more ad impressions to a web client 102.

An ad exchange 112 may comprise a computer-based system that facilitates online purchases and sales of ad impressions. In various embodiments, media buyer system 110 may communicate with ad exchange 112, which may itself communicate with a variety of advertising networks (or "ad networks"), to purchase one or more ad impressions, as described elsewhere herein. For example, in various embodiments, media buyer system 110 may communicate with a plurality of ad exchanges 112 (e.g., AdECN®, Right Media®, DoubleClick®, and/or Zinc Exchange®) to purchase one or more ad impressions. Further, in various embodiments, an ad exchange 112 may communicate with a media buyer system 110, a service provider system 108, and/or a transaction account issuer system 106 for the purchase and delivery of one or more ad impressions to a web client 102.

Merchant system 114 may comprise a system owned and/or operated by a merchant. In various embodiments, merchant system 114 may comprise one or more databases, one or more web servers, one or more application servers, and the like. A merchant system 114 may communicate with a transaction account issuer system 106, a service provider system 108, a media buyer system 110, and/or an ad exchange 112 to request an ad campaign, or to make an ad campaign request, as described elsewhere herein.

Figure 2A:
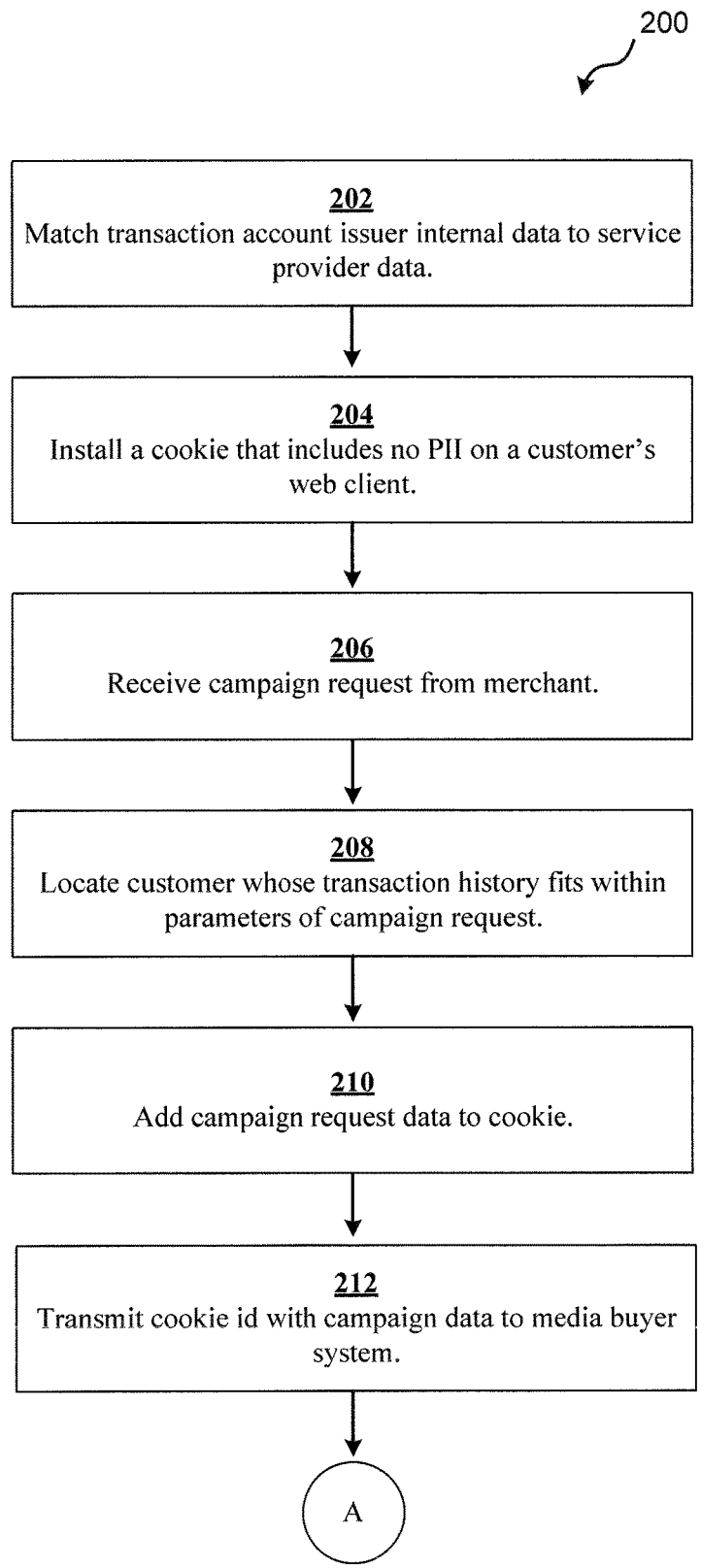
FIGS. 2A and 2B shows a flowchart depicting an exemplary process for targeting an ad impression in accordance with various embodiments.
Figure 2B:
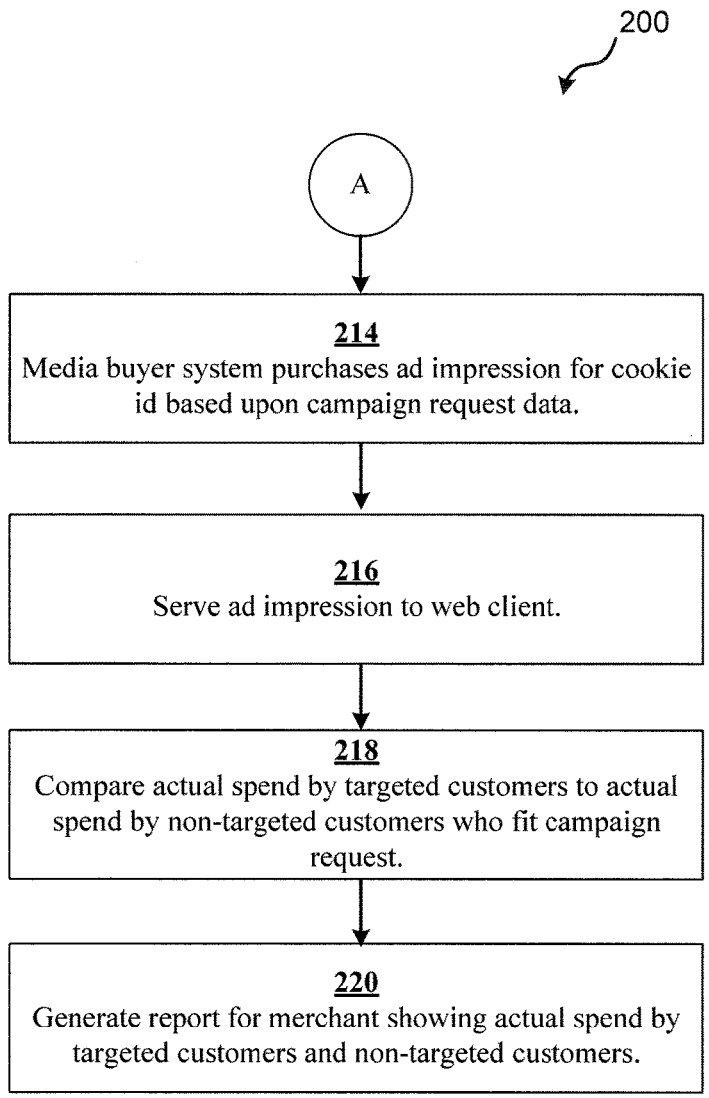
Figure 3:
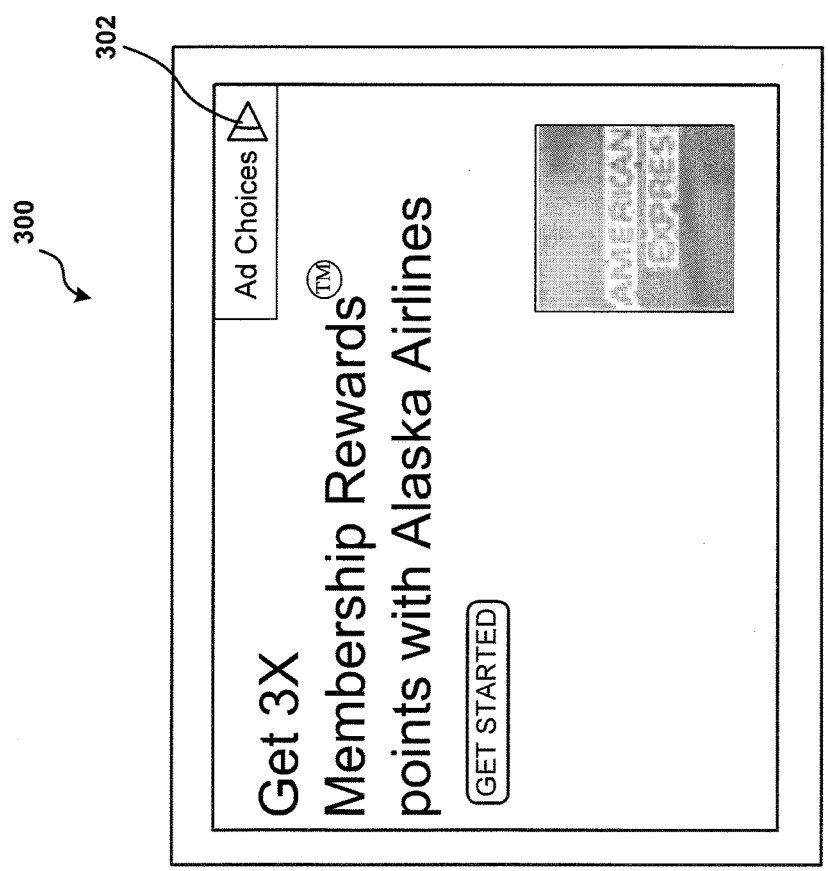
FIG. 3 shows an exemplary screenshot depicting an opt in and opt out selection feature in accordance with various embodiments.
Figure 4:
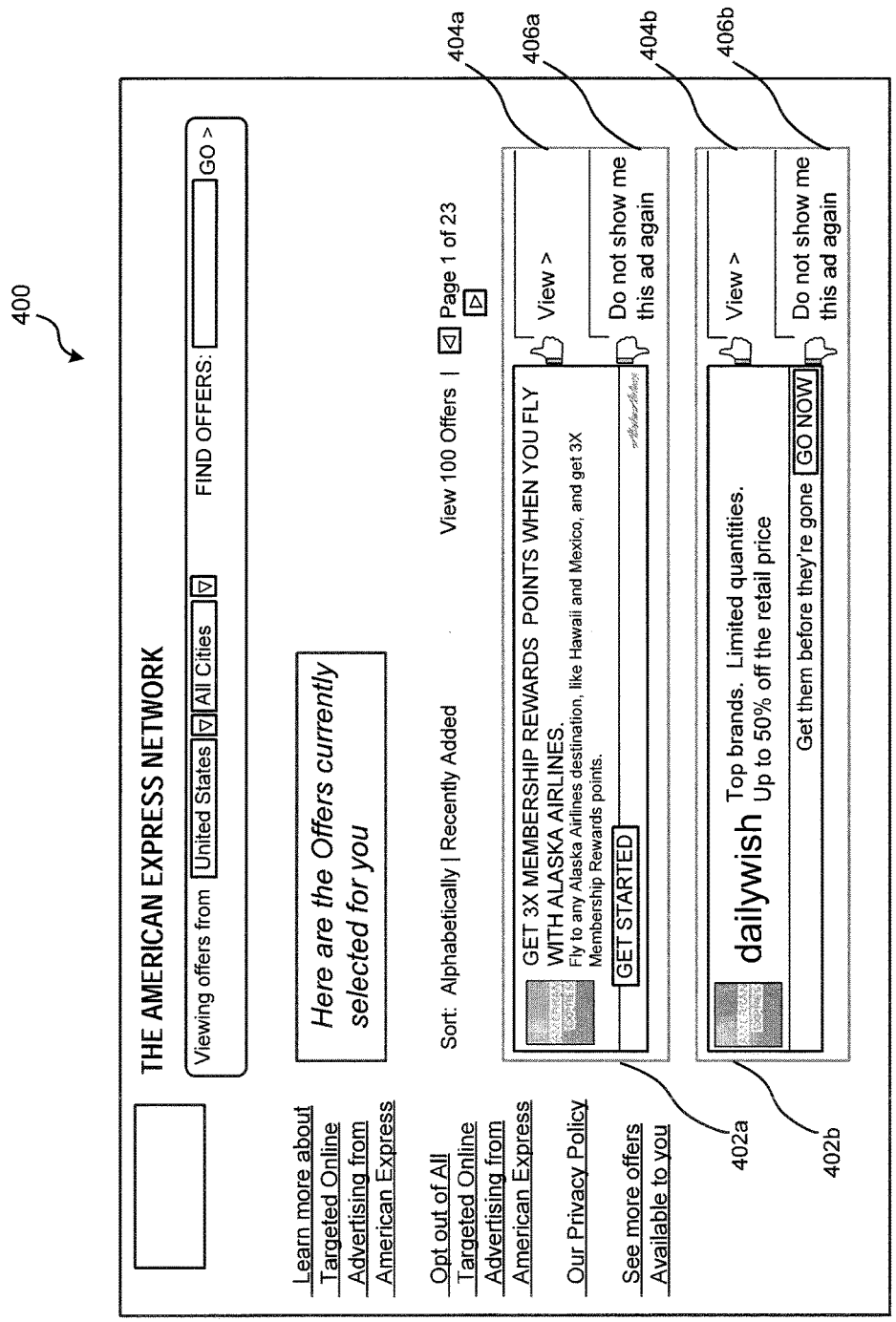
FIG. 4 shows an exemplary screenshot depicting an opt in and opt out selection feature associated with a plurality of ad impressions in accordance with various embodiments.

Referring now to FIGS. 2-4, the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2-4, but also to the various system components as described above with reference to FIG. 1.

With reference to FIGS. 2A and 2B, a process 200 for targeting ad impressions is disclosed. A transaction account issuer system 106 and/or a service provider system 108 may match transaction account issuer internal data to service provider data (step 202). More particularly, and in various embodiments, a transaction account issuer system 106 and/or a service provider system 108 may match internal data (e.g., transaction account customer PII such as a name and/or an address of a customer) provided by transaction account issuer system 106 to PII stored by service provider system 108. The result of this matching may comprise a list or "matched list" of transaction account customers whose PII also exists in a database or data store associated with service provider system 108. These customers may be referred to herein as "matched customers." Thus, a matched list may comprise a list of matched customers, and a matched customer may comprise a transaction account customer whose identity, or PII, is also known to, or stored by, system 108.

Service provider system 108 and/or transaction account issuer system 106 may install a cookie on a web client 102 associated with a matched customer (step 204). This installation may occur in response to generation of a matched list, and the cookie may not include any PII associated with the matched customer. That is, a cookie, or an "anonymized cookie," may be stripped of any PII that may be associated with a matched customer (e.g., PII that was used to match a transaction account customer to an individual whose PII is known to service provider system 108). A cookie, or an anonymized cookie, may be installed on a matched customer's web client 102. In addition, transaction account issuer system 106 and/or service provider system 108 may maintain an anonymized list of matched customers. For example, a list of matched customers may comprise a list of cookie data associated with each matched customer. The anonymized list may exclude PII. Thus, customer privacy may be safeguarded by systems 106 and/or 108.

A transaction account issuer system 106 and/or a service provider system 108 may receive a campaign request from a merchant (step 206). A campaign request may comprise a request by a merchant to target marketing (e.g., ad impressions associated with the merchant) to a particular group of customers. This group of customers may be associated with, or identified by, one or more attributes (e.g., shopping attributes, purchasing attributes, PII, transaction history information, demographic information, etc.) For example, a campaign request may comprise a request by a merchant who sells electronics to target transaction account customers who are associated with greater than a threshold number of records of charge ("ROCs") in the electronics industry and who live in a particular geographic region.

Similarly, in various embodiments, a campaign request may comprise a request by a merchant to target marketing to a group of customers based upon any code or identifier. For example, the code may include a universal product code ("UPC") and/or a stock keeping unit ("SKU"). A UPC may comprise a machine-readable bar code coupled with a human-readable UPC number, either of which may be printed on a label or tag which is placed on an item of merchandise for purchase. A manufacturer may assign and mark each product that it sells with a UPC. Further, once an item reaches a retailer, the retailer may further identify the item with a SKU number or code and/or a variety of other information for identifying a specific item or style of merchandise. A retailer's SKU number may be either an entirely different number used to identify each item (e.g., by style) or a modified version of the manufacturer's UPC number, derived, for example, by adding a SKU number to the UPC number. Thus, in various embodiments, a merchant may request that marketing be targeted based upon one or more UPCs and/or SKUs associated with a customer's transaction history.

In response to receiving a campaign request, a transaction account issuer system 106 may locate a customer record associated with a customer whose transaction history and/or attribute information fits within the parameters associated with the campaign request (step 208). For example, transaction account issuer system 106 may locate a customer record associated with a customer who has greater than a threshold number of ROCs in a particular industry (e.g., the electronic industry) and who resides in a particular geographic area (e.g., New York, N.Y.).

Transaction account issuer system 106 may add, or request that service provider system 108 add, campaign request data to a matched customer's cookie and/or the cookie data associated with the customer in a matched list (step 210). This may occur in response to locating a customer record associated with a customer who fits within the parameters associated with the campaign request. Campaign request data may be added to a cookie and/or to cookie data as a flag and/or an identifier (e.g., a numeric or alphanumeric identifier). An identifier and/or a flag may identify a campaign request and/or the attributes comprising a particular campaign request. For example, a flag may identify a campaign request targeted to customers who have greater than a threshold number of ROCs and who reside in a particular geographic area.

In various embodiments, a customer may navigate or surf to a particular website, whereupon the customer's web client 102 (or a browser installed on the customer's web client 102) may transmit the cookie installed on the web client 102 to service provider system 108 and/or transaction account issuer system 106. A web client 102 may transmit a cookie to a service provider system 108 and/or a transaction issuer system 106, for example, in the event that system 106 and/or system 108 has established a relationship (e.g., a partnership, or an agreement to transmit a cookie in response to navigation to the website) with the website. Thus, for example, where system 108 has a relationship with a particular website, and a customer navigates to that website, the customer's web client 102 may transmit the customer's cookie to system 108.

A cookie and/or a variety of cookie data (e.g., a cookie id and a flag associated with one or more campaign requests) may be transmitted to a media buyer system 110 (step 212). This may occur in response to receipt of a cookie by a system 108 and/or 106 of a customer's cookie from a website with which the system 108 and/or 106 has a relationship (because, receipt of the cookie indicates that the customer is online). Thus, and in various embodiments, cookie data may be transmitted to a media buyer system 110 in response to a campaign request and when the customer is online. A media buyer system 110 may compare a flag associated with a particular cookie id to a list of flags (which list the media buyer system 110 may receive from a transaction account issuer system 106). A media buyer system 110 may, based upon the comparison, determine that a particular flag is associated with a particular campaign request. For example, a media buyer system 110 may determine that a flag is associated with a campaign request made by a particular merchant (e.g., a purveyor of electronics). A media buyer system 110 may thus communicate with an ad exchange 112 to purchase, or bid on, one or more ad impressions for the cookie id based upon the flag (step 214). For example, a media buyer system 110 may purchase an ad impression associated with a merchant (e.g., the purveyor of electronics) who purchased or requested a particular campaign. A media buyer system 110 may further serve a purchased ad impression to a web client 102 associated with the cookie id for which the ad impression was purchased (step 214). That is, for example, media buyer system 110 may serve an ad impression to a web client 102 associated with a customer who fits a particular campaign request.

Thus, system 100 may facilitate the targeted marketing of ad impressions to transaction account customers based upon a variety of attributes (e.g., transaction history, demographics, and the like). Each ad impression may be served to a customer irrespective of a uniform resource locator ("URL") or address entered in a browser associated with the customer's web client 102. That is, system 100 may facilitate the delivery of targeted ad impressions to customers irrespective of a website to which each customer has surfed. Thus, system 100 may permit the targeted delivery of ad impressions across the web.

In various embodiments, transaction account issuer system 106 may measure the success of a campaign request. For example, transaction account issuer system 106 may compare an actual spend by targeted customers to an actual spend by non-targeted customers who nevertheless fit the campaign request (step 218). That is, transaction account issuer system 106 may compare expenditures associated with customers who received targeted ad impressions as a result of a campaign request to customers who, although they did not receive targeted ad impressions, nevertheless fit the parameters of the campaign request. The difference between the expenditures of targeted and non-targeted customers may illustrate an increase in value or sales arising as a result of a campaign request. In addition, click through rates (i.e., the number of targeted advertisements transmitted to web clients 102 compared to the number of transmitted targeted advertisements actually clicked on or selected by customers) may be gathered or calculated. Transaction account issuer system 106 may, in various embodiments, generate a report that illustrates this increase in value or sales (or a decrease, if this should occur) and/or click through rates. This report and/or the data comprising the report may be transmitted to one or more merchants, e.g., a merchant associated with the particular campaign request (step 220).

A merchant may utilize a report showing click through rates and/or the increase or decrease in value or sales arising as a result of a campaign request to optimize future campaign requests. For example, a merchant may optimize or update a first request to target customers with a ROC higher than a threshold of three ROCs/month in a particular industry to a second request to target customers with a ROC higher than a threshold of five ROCs/month in the industry. A merchant may, for example, choose to optimize a campaign request in this way based upon a narrow or small increase in sales to targeted customers over sales to customers who fit the campaign request but were not served ad impressions.

In various embodiments, system 100 may perform look alike modeling. For instance, in a variety of embodiments, a service provider system 108 may receive or generate a matched list, as described elsewhere herein. Service provider system 108 may, as further described elsewhere herein, update cookies comprising the matched list with campaign request data (e.g., a flag). However, in addition to targeting ad impressions to customers associated with the matched list, in a variety of embodiments, system 108 may compare attributes of matched customers to attributes associated with other, non-matched, consumers. These non-matched consumers may not hold transaction accounts issued by transaction account issuer system 106. Where system 108 locates consumers with attributes that are similar, or look like, attributes associated with matched customers, system 108 may request that media buyer system 110 purchase ad impressions for these consumers as well. That is, system 108 may add a flag associated with a campaign request to the cookies of consumers who are not associated with the matched list. Media buyer system 110 may purchase, or bid on, ad impressions for these consumers as described elsewhere herein.

Thus, system 100 may not only target ad impressions to customers based upon a merchant campaign request; it may target ad impressions to consumers who look like those customers selected by transaction account issuer system 106 for participation in a campaign request. In other words, system 100 may serve ad impressions to any consumer whose PII is known to or stored by with service provider system 108.

With reference now to FIG. 3, system 100 may permit a customer or consumer to select one or more types or categories of ad impressions. More particularly, system 100 may display, or cause to be displayed, a web page or dialog box 300, which may include an ad impression selection option 302. A customer or consumer may use this option to select one or more types or categories of ad impression in which the customer or consumer is interested or in which the customer or consumer has little or no interest. For example, a customer or consumer may select an electronics or fashion option, in which case, the customer or consumer may receive ad impressions associated with electronics and fashion retailers and/or merchants offering similar items for sale. Similarly, a customer or consumer may select a romance or literature option to indicate, rather than that the customer is interested in ad impressions related to these subjects, that the customer or consumer prefers not to receive ad impressions associated with these subjects.

With reference to FIG. 4, system 100 may, in addition, permit a customer or consumer to opt out of a particular ad impression. For example, system 100 may display, or cause to be displayed, a web page or dialog box 400, which may include one or more ad impressions 402a and/or 402b. A customer or consumer may choose to view one of the ads 402a and/or 402b by selecting a "View" (or similar) option 404a and/or 404b. A customer or consumer may, in addition, opt out of one or more ad impressions by selecting an opt out option 406a and/or 406b.

In various embodiments, whether a customer or a consumer chooses to opt into or out of a category or type of ad impressions or a particular ad impression, a transaction account issuer system 106 and/or a service provider system 108 may modify a cookie associated with the customer or consumer to associate or dissociate the customer or consumer with the category, type, or particular ad impression. For instance, system 106 and/or 108 may add a flag associated with a particular type or category of ad impression (which may be the same as a flag associated with a campaign request) to a customer's or consumer's cookie. This flag may be used, as described elsewhere herein, to purchase and deliver ad impressions to a customer or consumer. Likewise, system 106 and/or system 108 may remove a flag associated with a particular type or category of ad impression, or with a particular ad impression, from a customer's or consumer's cookie. Where a flag is removed, a media buyer system may not bid on the type, category, or particular ad impression associated with that flag. Thus, a customer or consumer may selectively opt into and out of ad impressions based upon the user's preferences.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers. A user may include any individual, business, entity, government organization, software and/or hardware that interact with a system.

In an embodiment, various components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "cardmember", "business" or "merchant" may be used interchangeably with each other, and each may mean any person, entity, machine, hardware, software or business. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The merchant computer and the bank computer may be interconnected via a second network, referred to as a payment network. The payment network which may be part of certain transactions represents existing proprietary networks that presently accommodate transactions for credit cards, debit cards, and other types of finanical/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, upgraded software, a stand alone system, a distributed system, a method, a data processing system, a device for data processing, and/or a computer program product. Accordingly, the system may take the form of an entirely software embodiment, an entirely hardware embodiment, or an embodiment combining aspects of both software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

In yet another embodiment, the transponder, transponder-reader, and/or transponder-reader system are configured with a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

Phrases and terms similar to "account", "account number", "account code," "consumer account," or "transaction account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The system may include or interface with any of the foregoing accounts or devices, a transponder and reader in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092 /ECMA-340, Near Field Communication Interface and Protocol-1 (NFCIP-1); ISO/IEC 21481 /ECMA-352, Near Field Communication Interface and Protocol-2 (NFCIP-2); and EMV 4.2 available at http://www.emvco.com/default.aspx.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

Phrases similar to a "payment processor" may include a company (e.g., a third party) appointed (e.g., by a merchant) to handle transactions for merchant banks. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction. Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in *In Re Nuijten* to fall outside the scope of patentable subject matter under 35 U.S.C. § 101.

What is claimed is:

1. A method comprising:
    determining, by a computer-based system, a first group of customers for an ad impression;
    selecting, by the computer-based system and based on the determining, a second group of customers based on look alike modeling of the first group of customers, wherein a first customer is part of the second group of customers;
    creating, by the computer-based system, a tag that includes a campaign request by a merchant, wherein the campaign request indicates the ad impression for the first customer based on the tag;
    further creating, by the computer-based system, the tag with additional instructions that cause, upon a web client navigating to a website, a cookie to be transmitted from the web client to the media buyer system to indicate that the first customer is online such that the media buyer system purchases the ad impression that is sent to the first customer;
    tagging, by the computer-based system, the cookie with the tag that includes the campaign request for the first customer;
    anonymizing, by the computer-based system, the cookie to create an anonymized cookie by stripping the personal information (PII) that is associated with a first customer;
    installing, by the computer-based system, the anonymized cookie on the web client associated with the first customer;
    receiving, by the computer-based system, data from the anonymized cookie;
    modifying, by the computer-based system, the tag associated with the cookie to at least one of: associate or disassociate the first customer with at least one of: a category or type of the ad impression;
    selecting, by the computer-based system, the ad impression from the at least one of: the category or the type of the ad impression;
    transmitting, by the computer-based system, the ad impression to the web client associated with the first customer;
    identifying, by the computer-based system, a first expenditure associated with the first customer that received the ad impression;
    comparing, by the computer-based system, the first expenditure to a second expenditure associated with a second customer that did not receive the ad impression based on the campaign request but fits parameters associated with the campaign request; and
    generating, by the computer-based system, a report showing the results of the comparing.

2. The method of claim 1, wherein the computer-based system includes at least one of the service provider system or the transaction account issuer system.

3. The method of claim 1, wherein the first customer is part of an anonymized list of customers created based on a type of customer to be targeted by the merchant as part of the campaign request.

4. The method of claim 1, further comprising:
    identifying the first customer by analyzing the PII from a list of customer records,
    wherein the PII from a transaction account issuer system satisfies the PII stored by the service provider system.

5. The method of claim 1, further comprising receiving the campaign request from the merchant, wherein the campaign request includes the type of customer to be targeted.

6. The method of claim 1, further comprising determining, by the computer-based system, a value of the ad impression based on the comparing.

7. The method of claim 1, wherein the campaign request is associated with a product identifier.

8. The method of claim 1, further comprising permitting, by the computer-based system and via the web client, the first customer to select the type of the ad impression in which the first customer is interested.

9. The method of claim 1, wherein the report includes a click through associated with the first customer that received the ad impression.

10. The method of claim 1, wherein the cookie is removed from a browser of the first customer in response to a selection by the first customer of the type of the ad impression in which the first customer is not interested.

11. The method of claim 1, wherein the tags are based on at least one of transaction history or attribute information that fits within parameters associated with the campaign request.

12. The method of claim 1, further comprising filtering, by the computer-based system, the anonymized list of customer records based on at least one of the product identifier, the type of customer, transaction history or attribute information that fits within parameters associated with the campaign request.

13. A system comprising:
    a processor;
    a tangible, non-transitory memory configured to communicate with the processor,
    the tangible, non-transitory memory having instructions stored thereon that, in response to execution by the processor, cause the processor to perform operations comprising:
    determining, by the processor, a first group of customers for an ad impression;
    selecting, by the processor and based on the determining, a second group of customers based on look alike modeling of the first group of customers, wherein a first customer is part of the second group of customers;

creating, by a processor, a tag that includes a campaign request by a merchant, wherein the campaign request indicates the ad impression for the first customer based on the tag;

further creating, by the processor, the tag with additional instructions that cause, upon a web client navigating to a website, a cookie to be transmitted from the web client to the media buyer system to indicate that the first customer is online such that the media buyer system purchases the ad impression that is sent to the first customer;

tagging, by the processor, the cookie with the tag that includes the campaign request for the first customer;

anonymizing, by the processor, the cookie to create an anonymized cookie by stripping the personal information (PII) that is associated with a first customer;

installing, by the processor, the anonymized cookie on the web client associated with the first customer;

receiving, by the processor, data from the anonymized cookie;

modifying, by the processor, the tag associated with the cookie to at least one of: associate or disassociate the first customer with at least one of: a category or type of the ad impression;

selecting, by the processor, the ad impression from the at least one of: the category or the type of the ad impression;

transmitting, by the processor, the ad impression to the web client associated with the first customer;

identifying, by the processor, a first expenditure associated with the first customer that received the ad impression;

comparing, by the processor, the first expenditure to a second expenditure associated with a second customer that did not receive the ad impression based on the campaign request but fits parameters associated with the campaign request; and generating, by the processor, a report showing the results of the comparing.

14. The system of claim 13, wherein processor is part of at least one of the service provider system or the transaction account issuer system.

15. The system of claim 13, wherein the first customer is part of an anonymized list of customers created based on a type of customer to be targeted by the merchant as part of the campaign request.

16. The system of claim 13, further comprising modifying, by the processor, the tag associated with the cookie to at least one of: associate or disassociate the first customer with at least one of: a category or type of the ad impression.

17. The system of claim 13, further comprising:

identifying the first customer by analyzing the PII from a list of customer records, wherein the PII from a transaction account issuer system satisfies the PII stored by the service provider system.

18. An article of manufacture including a non-transitory, tangible computer readable storage medium having instructions stored thereon that, in response to execution by a computer-based system, cause the computer-based system to perform operations comprising:

determining, by the computer-based system, a first group of customers for an ad impression;

selecting, by the computer-based system and based on the determining, a second group of customers based on look alike modeling of the first group of customers, wherein a first customer is part of the second group of customers;

creating, by a computer-based system, a tag that includes a campaign request by a merchant, wherein the campaign request indicates the ad impression for the first customer based on the tag;

further creating, by the computer-based system, the tag with additional instructions that cause, upon a web client navigating to a website, a cookie to be transmitted from the web client to the media buyer system to indicate that the first customer is online such that the media buyer system purchases the ad impression that is sent to the first customer;

tagging, by the computer-based system, the cookie with the tag that includes the campaign request for the first customer;

anonymizing, by the computer-based system, the cookie to create an anonymized cookie by stripping the personal information (PII) that is associated with a first customer;

installing, by the computer-based system, the anonymized cookie on the web client associated with the first customer;

receiving, by the computer-based system, data from the anonymized cookie;

modifying, by the computer-based system, the tag associated with the cookie to at least one of: associate or disassociate the first customer with at least one of: a category or type of the ad impression;

selecting, by the computer-based system, the ad impression from the at least one of: the category or the type of the ad impression;

transmitting, by the computer-based system, the ad impression to the web client associated with the first customer;

identifying, by the computer-based system, a first expenditure associated with the first customer that received the ad impression;

comparing, by the computer-based system, the first expenditure to a second expenditure associated with a second customer that did not receive the ad impression based on the campaign request but fits parameters associated with the campaign request; and generating, by the computer-based system, a report showing the results of the comparing.

* * * * *